US012693621B2

(12) United States Patent
Suzuki

(10) Patent No.: US 12,693,621 B2
(45) Date of Patent: Jul. 28, 2026

(54) IMAGE FORMING APPARATUS

(71) Applicant: Tatsuya Suzuki, Kanagawa (JP)

(72) Inventor: Tatsuya Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 19/001,311

(22) Filed: Dec. 24, 2024

(65) Prior Publication Data

US 2025/0216810 A1 Jul. 3, 2025

(30) Foreign Application Priority Data

Dec. 27, 2023 (JP) ................................ 2023-221895
Jun. 28, 2024 (JP) ................................ 2024-105334

(51) Int. Cl.
*G03G 21/12* (2006.01)
*G03G 15/01* (2006.01)
*G03G 21/10* (2006.01)

(52) U.S. Cl.
CPC ......... *G03G 21/12* (2013.01); *G03G 15/0189* (2013.01); *G03G 21/105* (2013.01)

(58) Field of Classification Search
CPC ........... G03G 15/0886; G03G 15/0879; G03G 21/1647
See application file for complete search history.

(56) References Cited

U.S. PATENT DOCUMENTS

2005/0019066 A1* 1/2005 Ito ...................... G03G 15/1685 399/302
2005/0249522 A1* 11/2005 Park ...................... G03G 21/12 399/120
2010/0021204 A1* 1/2010 Nakazawa ............. G03G 21/10 399/120
2011/0064475 A1 3/2011 Yoshida et al.
2017/0285565 A1* 10/2017 Sato ................... G03G 15/0886
2019/0286047 A1 9/2019 Ishimitsu et al.
2020/0133197 A1* 4/2020 Kaida ................ G03G 15/5033
2021/0103247 A1 4/2021 Akama et al.
2022/0137546 A1* 5/2022 Togu ...................... G03G 21/12 312/333
2024/0160125 A1 5/2024 Suzuki et al.

FOREIGN PATENT DOCUMENTS

JP 2011-064778 A 3/2011
JP 2016-164649 A 9/2016
JP 2019-113639 A 7/2019
JP 2022-181145 A 12/2022

* cited by examiner

*Primary Examiner* — Jessica L Eley
(74) *Attorney, Agent, or Firm* — XSENSUS LLP

(57) ABSTRACT

An image forming apparatus includes attachment portions, receiving ports, a storing portion, and an inner cover. The attachment portions are portions to which multiple image forming units, to form respective toner images with different colors from each other, are respectively attachable. The receiving ports are respectively disposed at the attachment portions, and are receivable waste toner respectively discharged from the multiple image forming units attached to the attachment portions. The storing portion communicates with each of the receiving ports to store the waste toner received by the receiving ports. The inner cover has a blocking portion blocking a part of the receiving ports other than a receiving port of an image forming unit of the multiple image forming units attached to the attachment portions.

20 Claims, 16 Drawing Sheets

IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2023-221895, filed on Dec. 27, 2023, and 2024-105334, filed on Jun. 28, 2024, in the Japan Patent Office, the entire disclosure of each of which is hereby incorporated by reference herein.

BACKGROUND

Technical Field

The present disclosure relates to image forming apparatuses.

Related Art

Some known image forming apparatuses conventionally include: an image forming unit attaching portion in which multiple image forming units that forms toner images with mutually different colors is mounted; multiple waste toner receiving ports that is provided in relation to the respective image forming units and receive waste toner discharged from the image forming units; and a waste toner accommodating portion that stores the waste toner received by the waste toner receiving ports.

An image forming apparatus in the art includes multiple shutter members that is movably supported therein. These shatter members are provided in the respective waste toner receiving ports and each have an opening portion by which the waste toner receiving ports are exposed and closing portions by which the waste toner receiving ports are blocked. The multiple shutter members is simultaneously moved in equal amounts by a moving mechanism. The opening portion of the shutter member related to the waste toner receiving port for black (B) is longer to the downstream side in the rotation direction of the shutter members than the opening portion of any other shutter member (i.e., any of the shutter members related to the waste toner receiving ports for yellow (Y), cyan (C), and magenta (M)). Thus, when the multiple shutter members is simultaneously moved by the moving mechanism, the waste toner receiving port for black (B) is opened by the opening portion of the corresponding shutter member earlier than any other waste toner receiving port.

When the above image forming apparatus is used as a monochrome machine, none of the image forming units for Y, C, and M is mounted, and the image forming unit for B is mounted in the image forming unit attaching portion for B of the image forming apparatus. In addition, the amount of movement of the shutter member by the moving mechanism is smaller than when the image forming apparatus is used as a color machine. In this case, the waste toner receiving port for B, which corresponds to the image forming unit for B, is opened by the shutter member, whereas the waste toner receiving ports for Y, C, and M are blocked.

The image forming apparatus in the related art, however, has to be provided with multiple shutter members in respective waste toner receiving ports and a moving mechanism that moves the shutter members. Such a large number of components may disadvantageously lead to cost increase.

SUMMARY

Embodiments of the present disclosure described herein provide a novel image forming apparatus including attachment portions, receiving ports, a storing portion, and an inner cover. The attachment portions are portions to which multiple image forming units, to form respective toner images with different colors from each other, are respectively attachable. The receiving ports are respectively disposed at the attachment portions, and are receivable waste toner respectively discharged from the multiple image forming units attached to the attachment portions. The storing portion communicates with each of the receiving ports to store the waste toner received by the receiving ports. The inner cover has a blocking portion blocking a part of the receiving ports other than a receiving port of an image forming unit of the multiple image forming units attached to the attachment portions.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
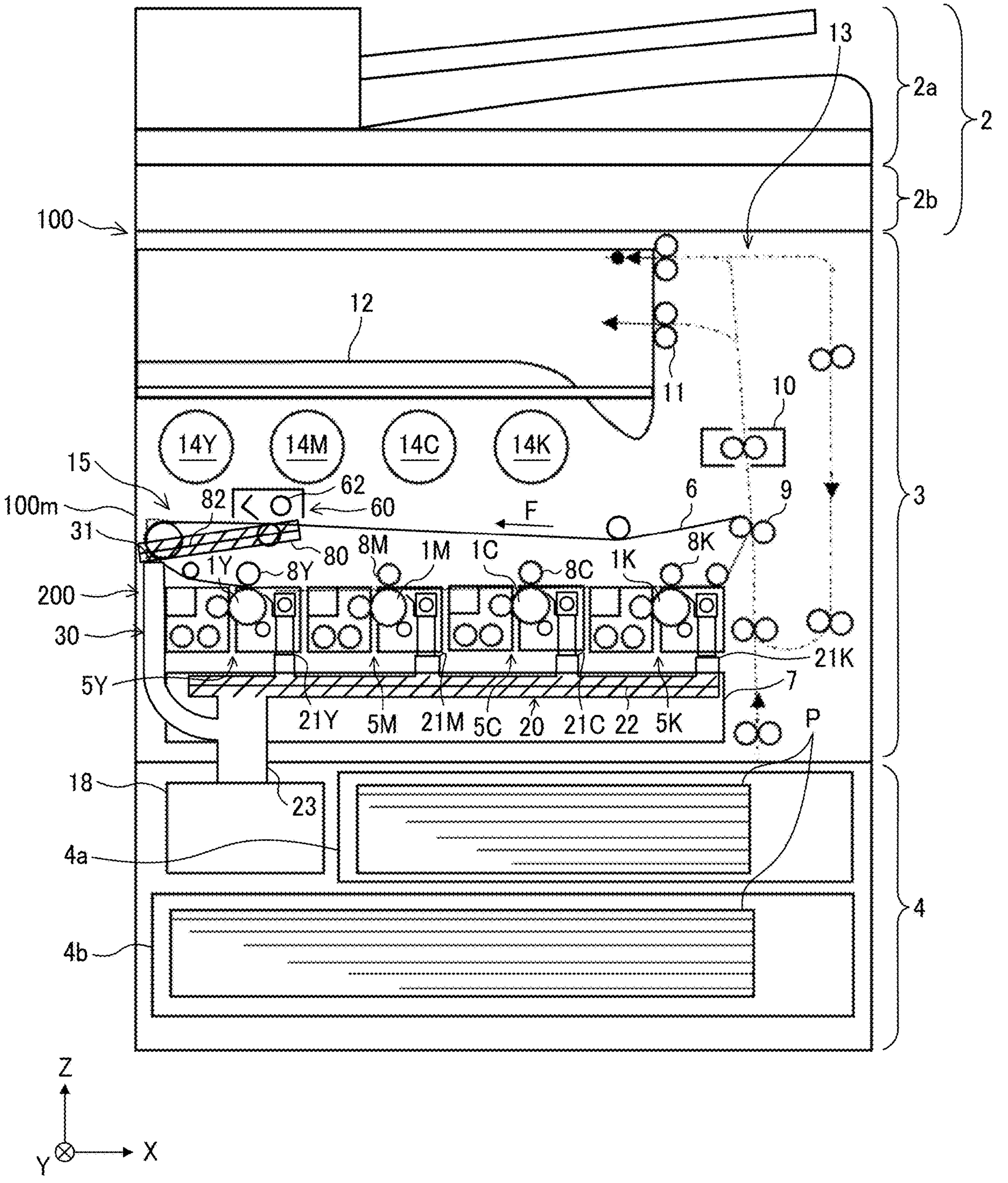
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Some preferred embodiments conceived to implement the present disclosure will be described below with reference to the accompanying drawings. It is to be understood that those skilled in the art can easily modify and vary the present disclosure within the scopes of the appended claims to conceive other embodiments, and such modifications and variations are obviously included in the scope of the appended claims. The following description is an example of the preferred embodiments of the present disclosure and is not intended to limit the scope of the claims.

The following describes an electrophotographic image forming apparatus, as an image forming apparatus to which the present disclosure is applied.

FIG. 1 is a schematic diagram illustrating a configuration of an image forming apparatus 100 according to the present embodiment.

In FIG. 1, a vertical direction with respect to the image forming apparatus 100 is indicated by arrow Z, a front-back direction is indicated by arrow Y, and a right and left direction is indicated by arrow X.

The image forming apparatus 100 includes: an image forming device 3; a sheet feeding device 4 serving as a feeder; and an image reading device 2 that reads an image on a document, which is a target from which an image is to be read. The image reading device 2, which is disposed above the image forming device 3, includes a document conveying unit 2*a* and a scanner unit 2*b*. The sheet feeding device 4, which is disposed below the image forming device 3, includes two sheet cassettes, or an upper sheet cassette 4*a* and a lower sheet cassette 4*b*, each of which stores transfer sheets P.

The image forming device 3 includes: an intermediate transfer unit 15 provided with an intermediate transfer belt 6 serving as an intermediate transfer body; and four image forming units 5Y, 5M, 5C, and 5K that form toner images with respective colors. The intermediate transfer unit 15 and image forming units 5Y, 5M, 5C, and 5K are arranged along the intermediate transfer belt 6, which surface-moves in the direction of an arrow F in FIG. 1. The image forming units 5Y, 5M, 5C, and 5K have, respectively, photoconductors 1Y, 1M, 1C, and 1K as cylindrical image carriers. In addition, the image forming device 3 includes an exposure device 7.

The intermediate transfer unit 15 includes: the intermediate transfer belt 6 having an endless shape which is hung over multiple support rollers; primary transfer rollers 8Y, 8C, 8M, and 8K; and a belt cleaning device 60 that cleans the surface of the intermediate transfer belt 6. The primary transfer rollers 8Y, 8M, 8C, and 8K, each of which is disposed inside the loop of the intermediate transfer belt 6, transfer toner images from the photoconductors 1Y, 1M, 1C, and 1K onto the intermediate transfer belt 6. Downstream of the primary transfer rollers 8Y, 8M, 8C, and 8K in a surface moving direction of the intermediate transfer belt 6, a secondary transfer roller 9 is disposed so as to face the intermediate transfer belt 6. In addition, the image forming device 3 includes a fixing device 10 that fixes an image onto a transfer sheet P and a sheet ejection roller 11, both of which are disposed above the secondary transfer roller 9.

The four image forming units 5Y, 5M, 5C, and 5K have substantially the same configuration except for the color of toner contained therein. Thus, the following description will be given with the suffixes Y, M, C, and K removed as appropriate. Each image forming unit 5 includes, around a photoconductor 1, a charging device that charges the surface of the photoconductor 1 and a developing device that develops a latent image on the photoconductor 1 with toner to form a toner image. In addition, each image forming unit 5 includes a cleaning device that cleans the surface of the photoconductor 1 after the toner image has been transferred from the photoconductor 1 to the intermediate transfer belt 6. Each image forming unit 5 is detachable from the front side (−Y side) of the image forming apparatus 100.

Next, an example of the operation of the image forming apparatus 100 according to the present embodiment will be described below.

When the image forming apparatus 100 receives a signal that instructs the start of image formation, the intermediate transfer belt 6 starts to surface-move. At the same time, the image forming unit 5Y for yellow causes the charging device to uniformly charge the photoconductor 1Y for yellow. The exposure device 7 then irradiates the photoconductor 1Y with a laser beam to form an electrostatic latent image. The developing device develops the electrostatic latent image to form a yellow toner image on the photoconductor 1Y for yellow. Likewise, the image forming units 5M, 5C, and 5K form, respectively, a magenta toner image, a cyan toner image, and a black toner image on the photoconductors 1M, 1C, and 1K. With the surface-movement of the intermediate transfer belt 6, the primary transfer rollers 8Y, 8M, 8C, and 8K sequentially transfer, respectively, the yellow, magenta, cyan, and black toner images, thereby forming a composite color image thereon. In this case, the image formation operations for the respective colors may be performed at different timings from the upstream side to the downstream side in the surface moving direction of the intermediate transfer belt 6 in such a way that the yellow, magenta, cyan, and black toner images are transferred onto and superimposed on the intermediate transfer belt 6 at substantially the same position.

When the sheet feeding device 4 feeds a transfer sheet P from the upper sheet cassette 4*a* or the lower sheet cassette 4*b*, the transfer sheet P is conveyed to a secondary transfer nip region, which is formed by the intermediate transfer belt 6 and the secondary transfer roller 9 serving as a secondary transcriber. Then, the composite color image on the intermediate transfer belt 6 is transferred onto the transfer sheet P by the secondary transfer roller 9, so that the color image is transferred onto the transfer sheet P. The transfer sheet P on which the image has been transferred is fed to a fixing device 10 serving as a fixer, which then fixes the transferred image on the transfer sheet P. After the fixing device 10 has fixed the color image on the transfer sheet P, the sheet ejection roller 11 serving as an ejector selects one of two conveyance configurations: in which the transfer sheet P is ejected and then stacked on another transfer sheet P on a sheet ejection tray 12; and in which the transfer sheet P is fed to a reverse passage 13 in order to form a toner image on the other surface of the transfer sheet P.

After the toner image has been transferred onto the transfer sheet P, the cleaning devices in the image forming units 5Y, 5M, 5C, and 5K clean, respectively, residual toner on the photoconductors 1Y, 1M, 1C, and 1K. Furthermore, after the toner image has been transferred, the belt cleaning device 60 cleans residual toner on the intermediate transfer belt 6.

If a developing device has consumed the toner during the image formation, a predetermined amount of color toner is replenished, through a toner conveyance passage, from a corresponding one of toner bottles 14Y, 14M, 14C, and 14K filled with yellow, magenta, cyan, and black toners, which are disposed on the upper left portion in FIG. 1. It should be noted that the arrangement of the four image forming units 5Y, 5M, 5C, and 5K and toner bottles 14Y, 14M, 14C, and 14K is not limited to the example illustrated in FIG. 1.

To copy a sheet of document with the image forming apparatus 100 according to the present embodiment, for example, the user places this document on the document conveying unit 2*a* of the image reading device 2. After having placed the document on the document conveying unit 2*a*, the user presses a copy start switch in an operation unit, thereby causing the image reading device 2 to start reading the document. More specifically, the document conveying unit 2*a* conveys the document, and then the scanner unit 2*b* reads the document being conveyed.

In parallel with the document reading operation, each of the devices in the image forming units 5Y, 5M, 5C, and 5K, the intermediate transfer belt 6, the secondary transfer roller 9, and the fixing device 10 starts to be driven. Based on image information read by the image reading device 2, the driving of the exposure device 7 is controlled in such a way that the Y, M, C, and K toner images are formed, respectively, on the photoconductors 1Y, 1M, 1C, and 1K.

The yellow, magenta, cyan, and black toner images are transferred onto the intermediate transfer belt 6 and superimposed on the intermediate transfer belt 6 so that a four-color toner image is formed.

Almost simultaneously with the start of the document reading operation, the sheet feeding device 4 starts a sheet feeding operation. During this sheet feeding operation, a transfer sheet P is fed from one of the upper sheet cassette 4*a* and the lower sheet cassette 4*b*. After having been fed, the fed transfer sheet P is conveyed toward the secondary transfer nip.

The image forming apparatus 100 further includes a waste toner conveying device 200 that conveys waste toner from the cleaning device of each of the image forming units 5Y, 5C, 5M, and 5K and the belt cleaning device 60 to a waste toner container 18. In this case, the waste toner conveying device 200 serves as a waste toner conveying portion; the waste toner container 18 serves as a waste toner accommodating portion.

The waste toner conveying device 200 includes: a first conveying unit 20 that conveys the waste toner from the cleaning devices of the image forming units 5Y, 5C, 5M, and 5K; a second conveying unit 30 that conveys waste toner from the belt cleaning device 60; and a waste toner communication passage 23 through which the waste toner conveyed from the first conveying unit 20 and the second conveying unit 30 is to pass.

The first conveying unit 20 includes waste toner receiving ports 21K, 21M, 21C, and 21Y that receive the waste toner conveyed from the cleaning devices in the image forming units 5Y, 5C, 5M, and 5K. In addition, the first conveying unit 20 is provided with a first waste toner conveyance screw 22 that conveys the waste toner dropped from each of the waste toner receiving ports 21K, 21M, 21C, and 21Y in the left direction of FIG. 1. The first conveying unit 20 has a left end, as illustrated in FIG. 1, coupled to the waste toner communication passage 23. The waste toner communication passage 23 is coupled to a waste toner collection port of the waste toner container 18. In short, the waste toner container 18 communicates with each of the waste toner receiving ports 21K, 21M, 21C, and 21Y via the waste toner conveying device 200 (the first conveying unit 20 and the waste toner communication passage 23).

By rotating the first waste toner conveyance screw 22, the waste toner in the first conveying unit 20 is conveyed to the left side of FIG. 1. Then, when reaching the waste toner communication passage 23, the waste toner drops into the waste toner container 18 via the waste toner communication passage 23.

One end of the second conveying unit 30 has a waste toner receiving port 31 that receives the waste toner conveyed from the intermediate waste toner conveyance passage 80, which conveys a waste toner from a belt cleaning device 60 provided in the intermediate transfer unit 15. The other end of the second conveying unit 30 is coupled to the waste toner communication passage 23. In short, the waste toner container 18 communicates with the waste toner receiving port 31 via the waste toner conveying device 200 (the second conveying unit 30 and the waste toner communication passage 23).

The intermediate waste toner conveyance passage 80 has a waste toner conveyance screw 82 therein. After having been conveyed by the cleaning conveyance screw 62 of the belt cleaning device 60, the waste toner is further conveyed by the waste toner conveyance screw 82 to the second conveying unit 30. After having been conveyed through the intermediate waste toner conveyance passage 80, the waste toner is delivered to the second conveying unit 30 via the waste toner receiving port 31. The waste toner then drops into the second conveying unit 30 while being conveyed and reaches the waste toner communication passage 23. After that, the toner drips into the waste toner container 18 via the waste toner communication passage 23. It should be noted that a conveyance coil may be provided in the second conveying unit 30, and waste toner in the second conveying unit may be conveyed by this conveyance coil to the waste toner communication passage 23.

Figure 2:
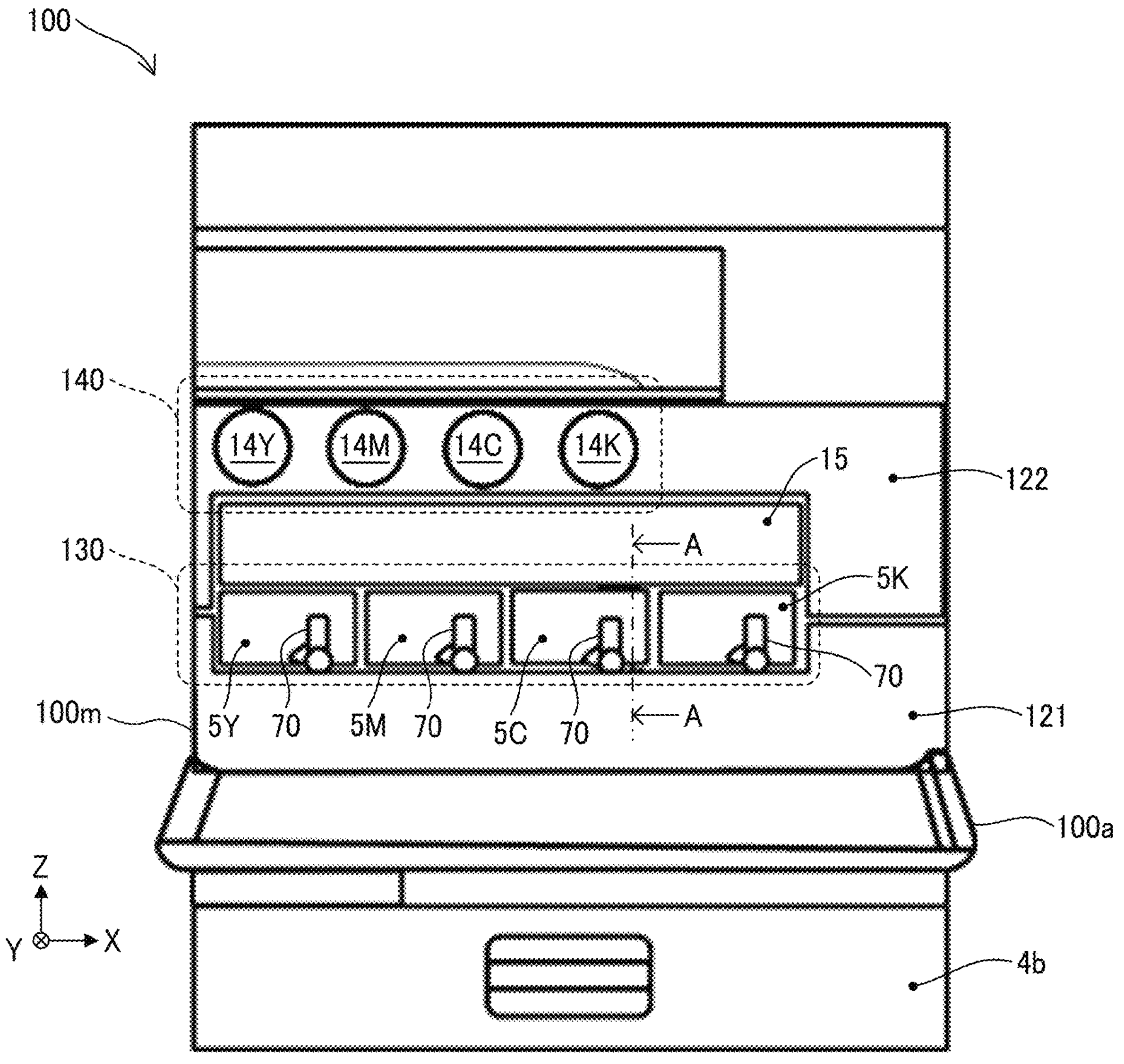
FIG. 2 is a schematic front view of the image forming apparatus with a front cover open.

FIG. 2 is a schematic front view of the image forming apparatus 100 with the front cover 100*a* open.

As illustrated in FIG. 2, the four image forming units 5Y, 5C, 5M, and 5K are mounted in the image forming unit attaching portion 130 of the image forming apparatus 100, whereas four toner bottles 14Y, 14M, 14C, and 14K are mounted in a toner bottle attaching portion 140.

The image forming apparatus 100 includes a first-color inner cover 121 and a second-color inner cover 122. The first-color inner cover 121 covers the waste toner conveying device 200, the exposure device 7, and some other components, thereby covering these components from being exposed when the front cover 100*a* is open. The second-color inner cover 122 covers the fixing device 10, the secondary transfer roller 9, and some other components, thereby covering these components from being exposed when the front cover 100*a* is open.

When the front cover 100*a* is open, as illustrated in FIG. 2, the image forming units 5Y, 5M, 5C, and 5K, the intermediate transfer unit 15, and the toner bottles 14Y, 14M, 14C, and 14K are all exposed. In this case, the user can operate the operation levers 70 to attach/detach the image forming units 5Y, 5M, 5C, and 5K to or from the front side (−Y side) of a housing 100*m* of the image forming apparatus 100. Likewise, the user can perform an unlock operation to attach/detach the toner bottles 14Y, 14M, 14C, and 14K to or from the front side (−Y side) of the housing 100*m* of the image forming apparatus 100. In addition, the user can perform an unlock operation and pull out the intermediate transfer unit 15 in the forward direction (−Y direction).

Figure 3:
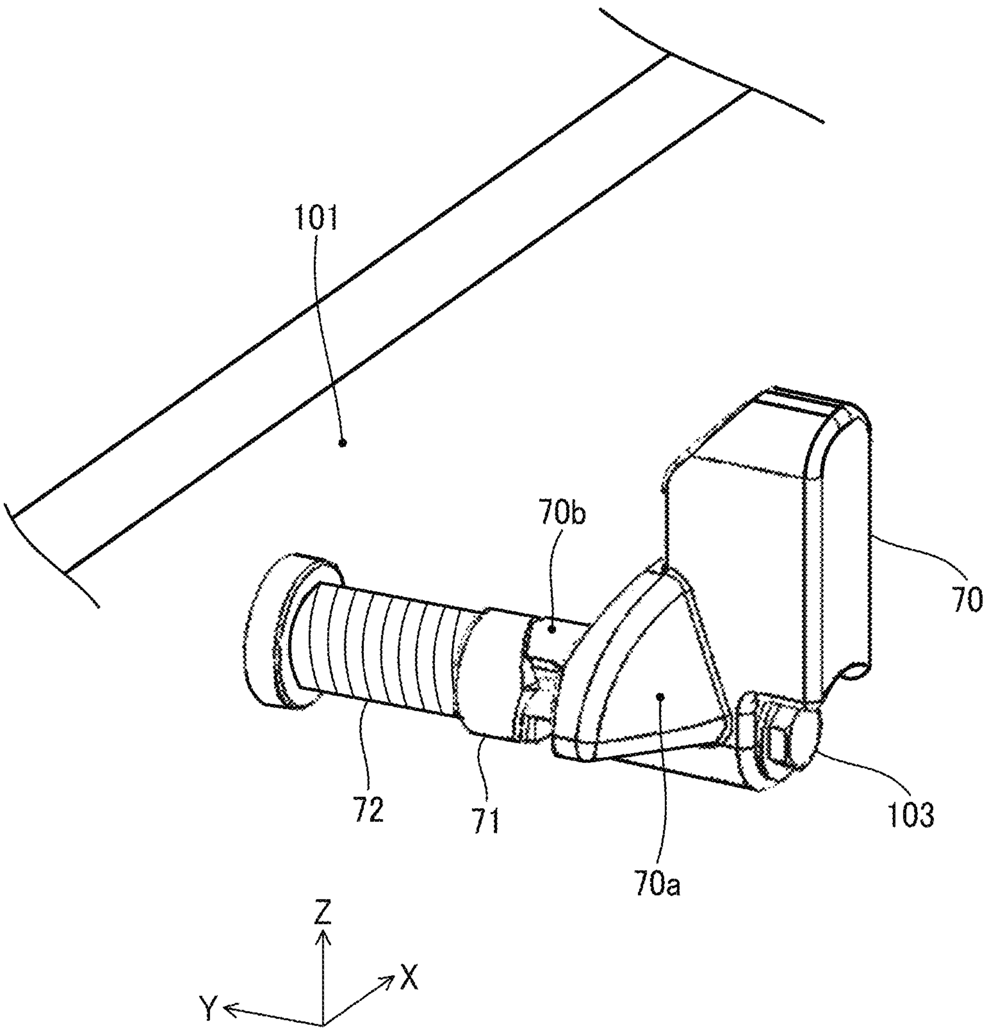
FIG. 3 is a perspective view illustrating an operation lever and some surrounding components.
Figure 4:
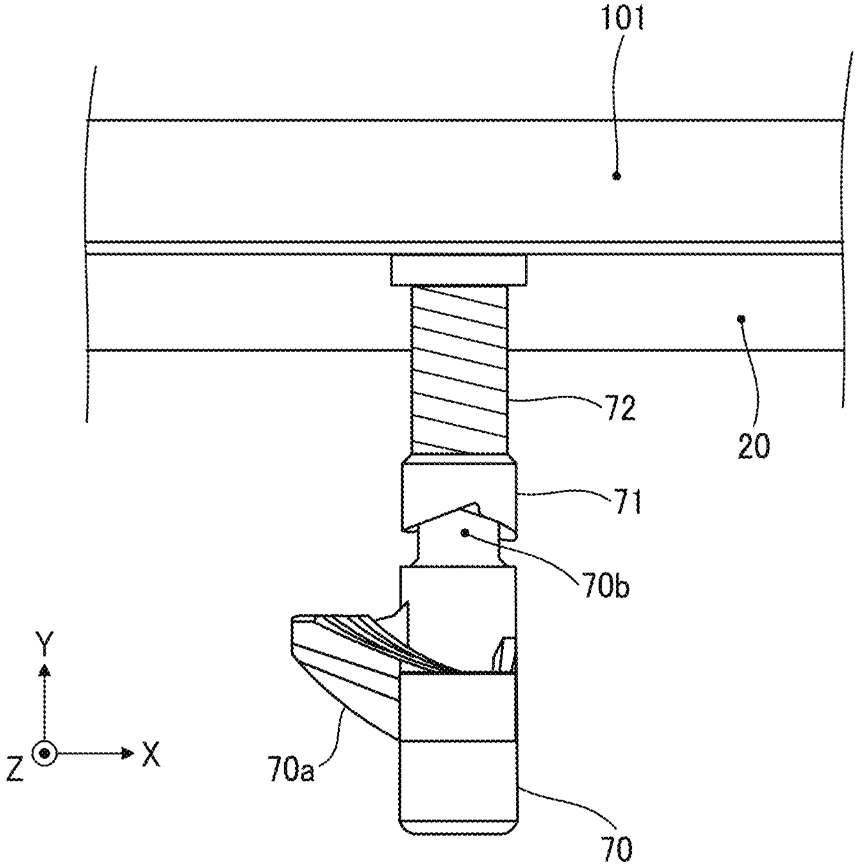
FIG. 4 is a plan view of the operation lever and the surrounding components.

FIG. 3 is a perspective view illustrating an operation lever 70 and some surrounding components; FIG. 4 is a plan view of the operation lever 70 and the surrounding components; and FIG. 5 is a perspective view illustrating a state in which an operation lever 70 has been removed.

Figure 5:
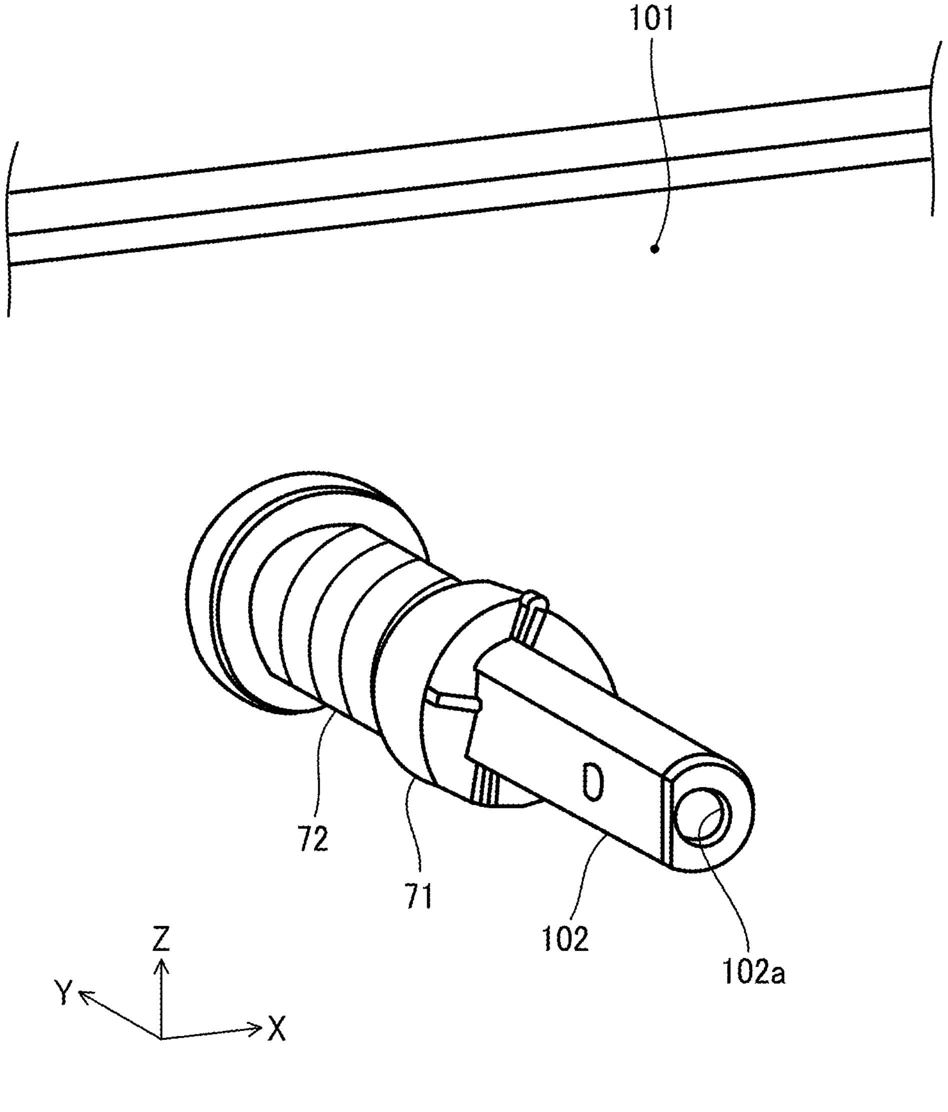
FIG. 5 is a perspective view illustrating a state in which an operation lever has been removed.

As illustrated in FIG. 5, a shaft 102 is secured to a front frame 101 of the housing 100*m* of the image forming apparatus 100. One end of the shaft 102 is provided with a female screw portion 102*a*. As illustrated in FIG. 3, a screw 103 is screwed to the female screw portion 102*a*, so that the operation lever 70 is rotatably attached to the shaft 102.

The operation lever 70 includes, as a locking portion, a unit restraining portion 70*a* that restrains the image forming unit 5 in a mounting position from being moved in the forward direction (−Y direction). The unit restraining portion 70*a* has a substantially fan shape with both side edges of the unit restraining portion 70*a* forming an angle of substantially 90° in the rotation direction of the operation lever 70. The rear side of the operation lever 70 (the side on the front frame 101 side) includes a projection 70*b* that protrudes toward the front frame 101 (in the +Y direction). The projection 70*b* has a mountain shape at an end.

As illustrated in FIG. 5, the end of the shaft 102 has the shape of the letter D. The operation lever 70 has a circular insertion hole into which the shaft 102 is to be inserted. The operation lever 70 is attached to the shaft 102 so as to be rotatable relative to the shaft 102.

The shaft 102 is attached to a cam 71. The cam 71 has a through-hole having the shape of the letter D in cross-section, through which the shaft 102 passes. The cam 71 is attached to the shaft 102 so as to be movable in the axial directions of the shaft 102 but not to be rotatable. As a result, the operation lever 70 is rotatable relative to the cam 71. The end of the cam 71 on the operation lever side has the shape of a mountain and a valley. The top of the cam 71 in the vertical direction (+Z direction) corresponds to the bottom of the valley. The top of the mountain is located at a position rotated about 90° in the counterclockwise direction of FIG. 5 from the valley. In addition, the bottom of the valley having a large step is located at a position rotated about 60° in the counterclockwise direction of FIG. 5 from the mountaintop (a position on the left of and obliquely above the bottom of the cam 71 in the vertical direction (+Z direction)).

The shaft 102 is also attached to a cam spring 72. The cam spring 72 is attached between the cam 71 and the front frame 101 while compressed while biasing the cam 71 toward the operation lever 70.

When the operation lever 70 is located in a position parallel to the vertical direction (+Z direction), namely, in a locking position in which the image forming unit 5 is locked, as illustrated in FIGS. 3 and 4, the mountaintop of the projection 70*b* is located at the bottom of the valley of the cam 71 which is the top of the cam 71 in the vertical direction (+Z direction). In this case, when the operation lever 70 is moved from the locking position to an unlocking position, the mountaintop of the projection 70*b* has to move up along the inclined surface of the cam 71 against the biasing force of the cam spring 72. Even if something bumps into the operation lever 70, a force may be applied to the operation lever 70 so as to rotate in the direction in which the operation lever 70 is unlocked. However, even if slightly rotated, the operation lever 70 can be returned to the locking position due to the biasing force of the cam spring 72. As a result, the image forming unit 5 can be maintained in the locking position.

Figure 6:
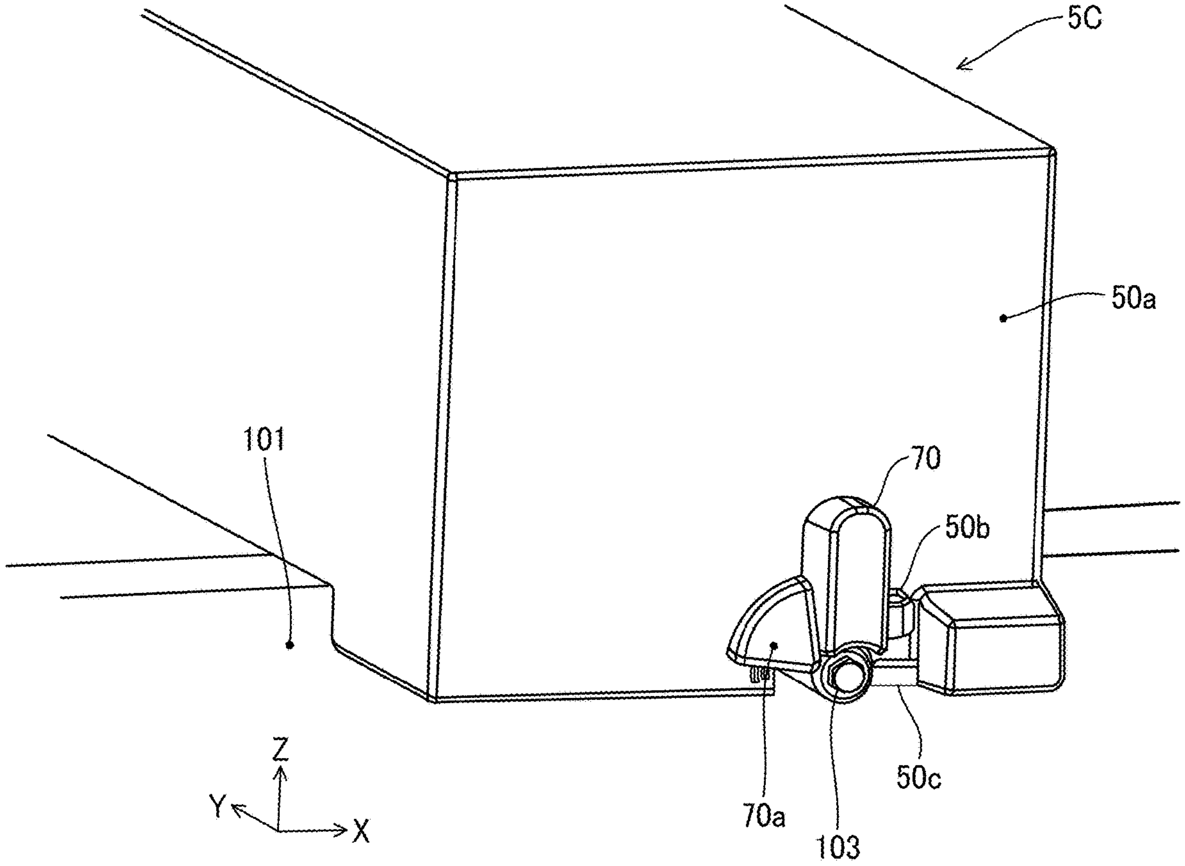
FIG. 6 is a schematic perspective view illustrating the front side of an image forming unit.

FIG. 6 is a schematic perspective view illustrating a front side of the image forming unit 5C.

In the following description, the image forming unit 5C will be described; however, it should be noted that the image forming units 5Y, 5M, and 5K have substantially the same configuration.

As illustrated in FIG. 6, the image forming unit 5C has a front cover 50*a*, which includes: a first restraining portion 50*b* that restrains the operation lever 70 from rotating in the clockwise rotation in FIG. 6; and a second restraining portion 50*c* that restrains the operation lever 70 from rotating in the counterclockwise rotation in FIG. 6. The first restraining portion 50*b* contacts the operation lever 70, thereby restraining the operation lever 70 in the locking position from rotating in the clockwise rotation in FIG. 6. The second restraining portion 50*c* contacts the unit restraining portion 70*a*, thereby restraining the operation lever 70 in the unlocking position from rotating in the counterclockwise rotation in FIG. 6.

As illustrated in FIG. 6, when the operation lever 70 is located in the locking position, in which the image forming unit 5C is locked in the mounting position, the unit restraining portion 70*a* contacts the front cover 50*a*, thereby restraining the image forming unit 5C from moving toward the front side (−Y direction).

Figure 7A:
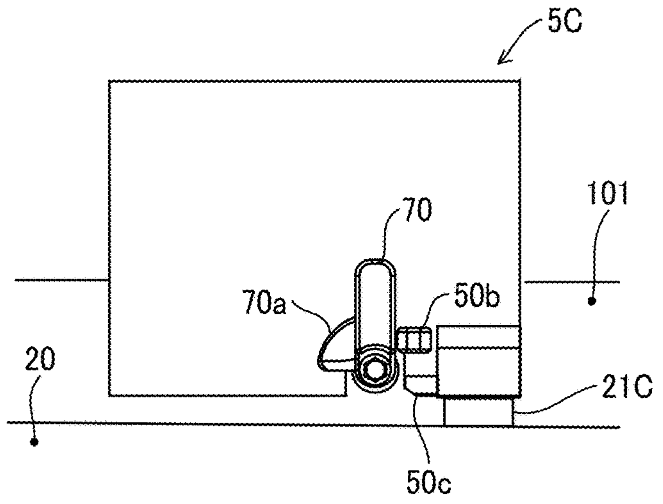
FIG. 7A is a diagram illustrating how to operate the operation lever.
Figure 7B:
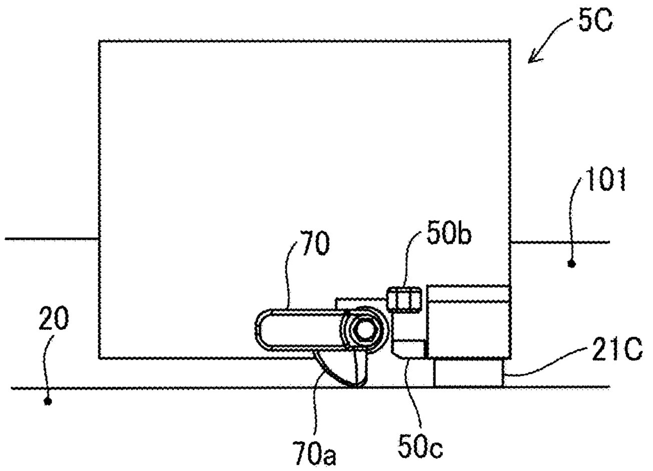
FIG. 7B is another diagram illustrating how to operate the operation lever.
Figure 7C:
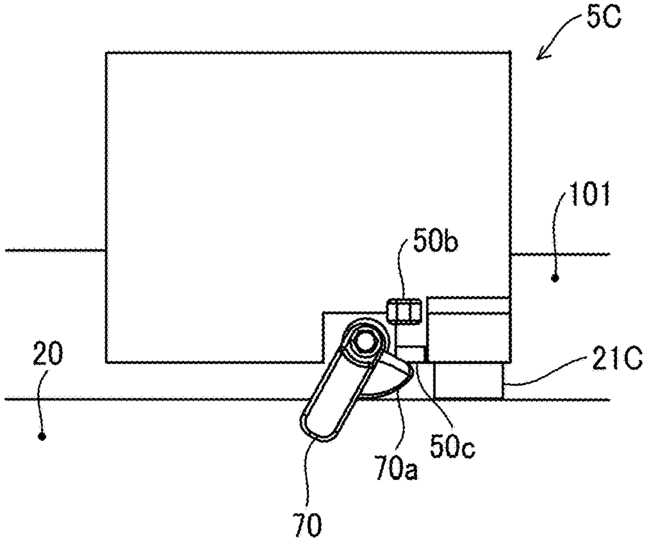
FIG. 7C is further another diagram illustrating how to operate the operation lever.

FIGS. 7A to 7C are diagrams illustrating how to operate the operation lever 70.

To release the lock, the user rotates the operation lever 70 located in the locking position illustrated in FIG. 7A, in the counterclockwise direction of FIG. 7A. In response, as illustrated in FIGS. 3 to 5, the mountaintop of the projection 70*b* moves up along the inclined surface of the cam 71 while pushing the cam 71 toward the rear side (the front frame 101 side) against the biasing force of the cam spring 72.

When the user rotates the operation lever 70 in the locking position about 90° in the counterclockwise direction of FIG. 7A, as illustrated in FIG. 7B, the mountaintop of the projection 70*b* of the operation lever 70 reaches the mountaintop of the cam 71. When the user further rotates the operation lever 70 in the counterclockwise direction of FIG. 7B, the mountaintop of the projection 70*b* moves beyond the mountaintop of the cam 71. In response, the biasing force of the cam spring 72 is switched from the force by which the operation lever 70 is restrained from rotating (the force by which the operation lever 70 is rotated to the locking position) to the force by which the operation lever rotates (the force by which the operation lever is rotated to the unlocking position). As a result, the load on the operation lever 70 being rotated is dramatically reduced, making the user of the operation lever 70 perceive a click feeling. When the user releases his/her hand from the operation lever 70 at the time when the user perceives the click feeling, the operation lever 70 automatically rotates in the counterclockwise direction of FIG. 7B due to the biasing force of the cam spring 72. Then, when the user rotates the operation lever 70 about 150°, the operation lever 70 is located in the unlocking position, as illustrated in FIG. 7C. In this case, the downstream end, in the rotation direction of the mountain (see FIGS. 3 and 4) of the projection 70*b*, of the operation lever 70 abuts against the step of the valley of the cam 71 (the mountaintop of the projection 70*b* of the operation lever 70 is located on the bottom of the valley on the lower side of the cam 71). As a result, the rotation of the operation lever 70 due to the biasing force of the cam spring 72 is stopped, so that the operation lever 70 stays in the unlocking position.

As illustrated in FIG. 7C, when the operation lever 70 is located in the unlocking position, the entire operation lever 70 including the unit restraining portion 70*a* no longer faces the image forming unit 5C in the +Y direction. In this case, the user can pull out the image forming unit 5C in the forward direction (−Y direction).

When the operation lever 70 is located in the unlocking position, as illustrated in FIG. 7C, the downstream end, in the counterclockwise direction of FIG. 7C, of the unit restraining portion 70*a* faces the second restraining portion 50*c* provided on the front cover 50*a* of the image forming unit 5C. As a result, the operation lever 70 in the unlocking position is restrained by the second restraining portion 50*c* from rotating in the counterclockwise rotation in FIG. 7C. In this way, the operation lever 70 can be located in the unlocking position.

When the operation lever 70 is in the unlocking position as illustrated in FIG. 7C, the mountaintop of the projection 70*b* of the operation lever is also located on the bottom of the valley of the cam 71. Thus, even if the user bumps into the operation lever 70 to slightly rotate the operation lever 70 in the clockwise direction, for example, the operation lever 70 can be returned to the unlocked position due to the biasing force of the cam spring 72.

To lock the image forming unit 5C in the mounting position, the user rotates the operation lever 70 located in the unlocking position, in the clockwise direction of FIG. 7C. Then, the mountaintop of the projection 70*b* moves beyond the mountaintop of the cam 71 at the timing as illustrated in FIG. 7B. In response, the biasing force of the cam spring 72 is switched from the force by which the operation lever 70 is restrained from rotating in the clockwise direction of FIG. 7B (rotating to the unlocking position) to the force by which the operation lever 70 is rotated in the clockwise direction of FIG. 7B (rotated to the locking position). This mechanism enables the user to perceive the click feeling. After that, the operation lever 70 can rotate due to the biasing force of the cam spring 72 without user's operation, so that the operation lever 70 can be automatically located in the locking position.

Figure 8:
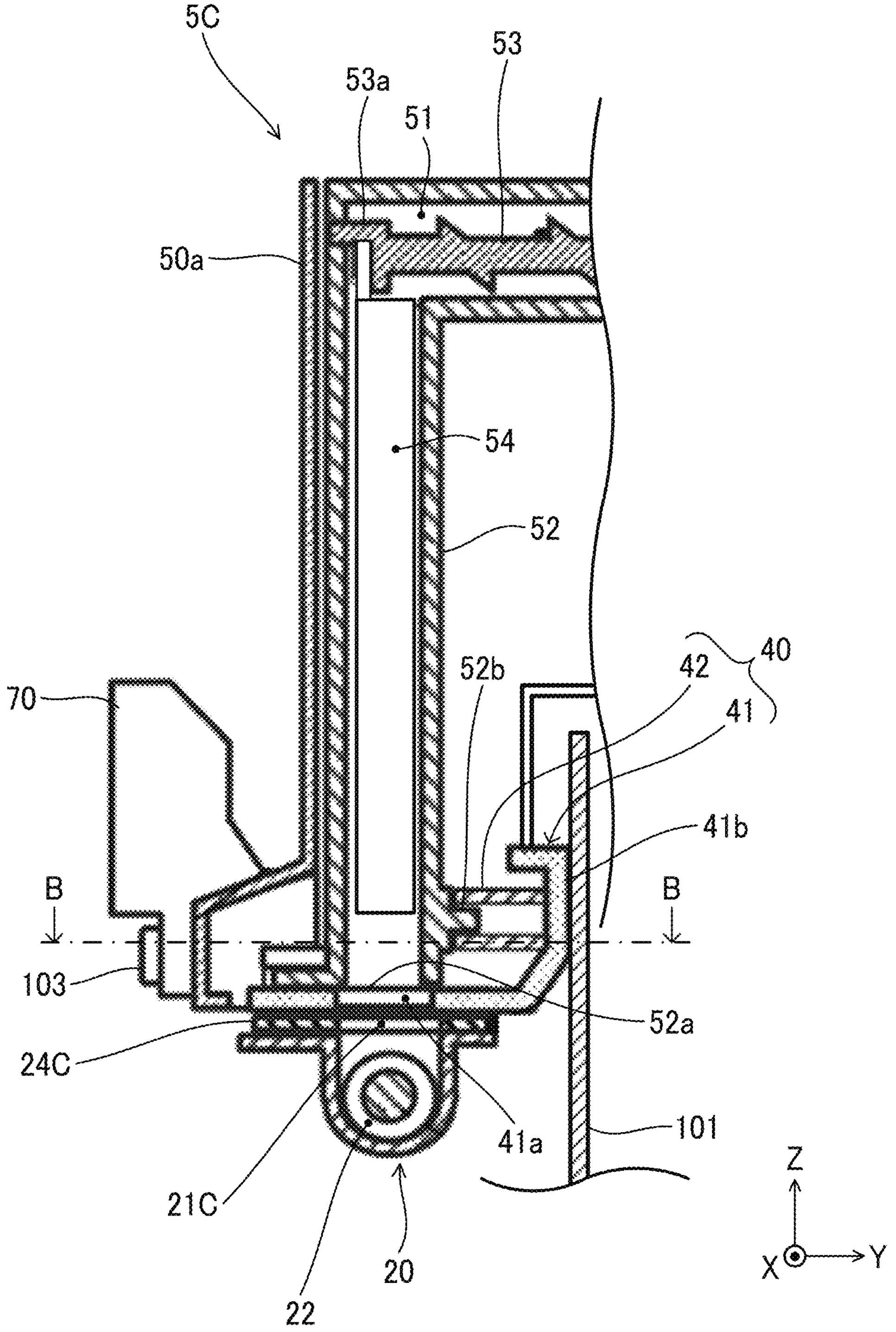
FIG. 8 is a cross-sectional view taken along line A-A of FIG. 2.
Figure 9:
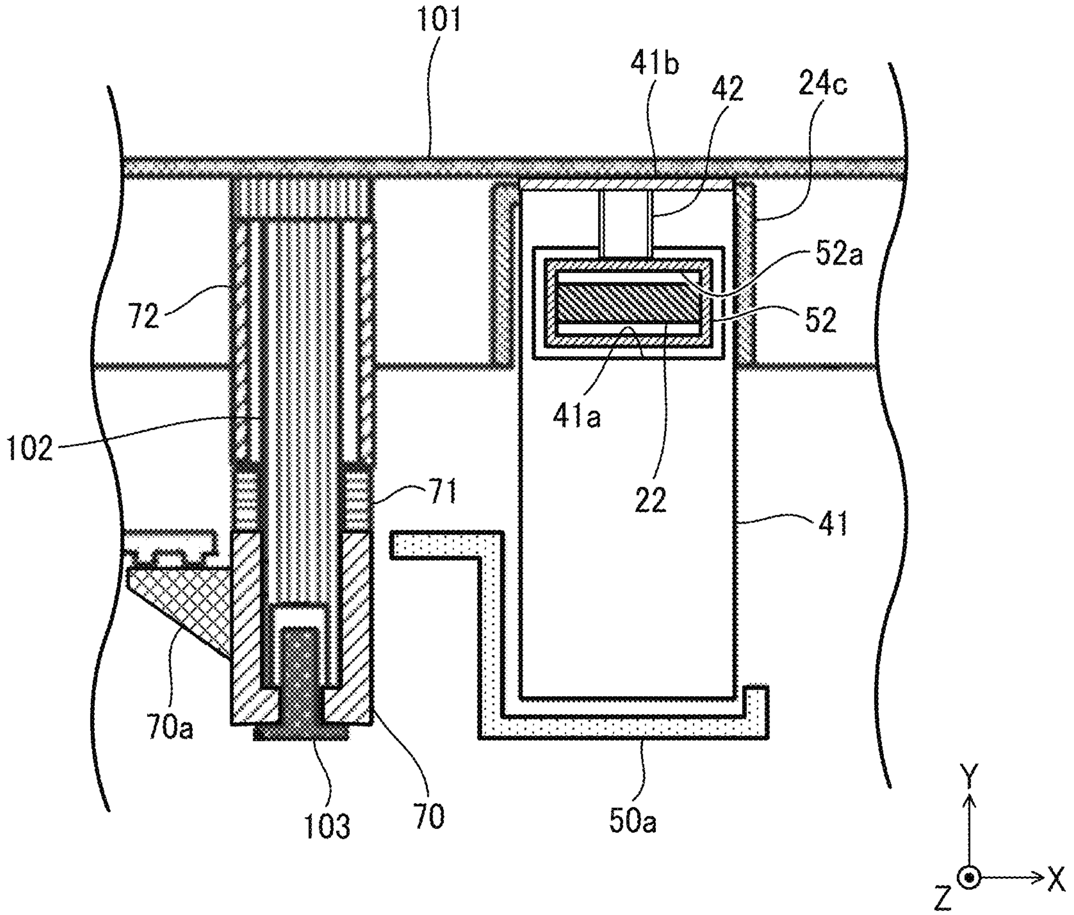
FIG. 9 is a cross-sectional view taken along line B-B of FIG. 8.

FIG. 8 is a cross-sectional view taken along line A-A of FIG. 2; FIG. 9 is a cross-sectional view taken along line B-B of FIG. 8.

In the following description, the image forming unit 5C will be described; however, the image forming units 5Y, 5M, and 5K have substantially the same configuration.

As illustrated in FIG. 8, the cleaning device in the image forming unit 5C has a waste toner conveyance screw 53, which extends inside a waste toner conveyance passage 51 along which waste toner of the cleaning device is to be conveyed.

The waste toner conveyance passage 51 has an end coupled to a waste toner drop passage 52. The waste toner drop passage 52 has a swing member 54. The swing member 54 is attached to an eccentric shaft portion 53*a* of the waste toner conveyance screw 53, which is disposed at the front end (−Y end) of the waste toner conveyance screw 53. As a result, with the rotation of the waste toner conveyance screw 53, the swing member 54 moves up and down in the vertical direction (Z direction) in the waste toner drop passage 52. This configuration can help the waste toner to drop freely, thereby preventing toner aggregation inside the waste toner drop passage 52.

The lower end of the waste toner drop passage 52 is provided with a shutter mechanism 40, which opens and closes a waste toner discharge port 52*a* of the waste toner drop passage 52. The shutter mechanism 40 includes a shutter member 41 and a compression spring 42. The shutter member 41 is supported on the waste toner drop passage 52 so as to be movable in the front-rear directions (+Y directions) of the image forming apparatus 100. The shutter member 41 has a biasing force receiving portion 41*b* on the rear side (+Y side), which extends upward and receives the biasing force of the compression spring 42. The shutter member 41 is provided with an opening 41*a* through which the waste toner discharge port 52*a* is to be exposed.

The compression spring 42 engages with a spring bearing 52*b* having a protruding shape, which is provided on the outer surface of the waste toner drop passage 52. The spring bearing 52*b* is compressed between the outer surface of the waste toner drop passage 52 and the biasing force receiving portion 41*b* of the shutter member 41.

When the user starts to mount the image forming unit 5C in the image forming unit attaching portion 130 of the housing 100*m* of the image forming apparatus 100, the shutter member 41 abuts against the front frame 101 of the image forming apparatus 100. Then, when the user proceeds to mount the image forming unit 5C, the shutter member 41 moves toward the front side (−Y direction side) of the image forming apparatus 100 relative to the image forming unit 5C against the biasing force of the compression spring 42. When the user further moves the image forming unit 5C until the image forming unit 5C is located in the mounting position, the waste toner discharge port 52*a* of the waste toner drop passage 52 and the waste toner receiving port 21C of the first conveying unit 20 become aligned with each other. In this case, the opening 41*a* of the shutter member 41 is located so as to be aligned with the waste toner discharge port 52*a*, thereby exposing the waste toner discharge port 52*a*. As a result, the waste toner of the cleaning device drips into the waste toner receiving port 21C through the waste toner discharge port 52*a*. In this way, the waste toner is discharged from the image forming unit 5C.

When the image forming unit 5C is mounted in the image forming unit attaching portion 130 with the shutter member 41 located in an open position, the image forming unit 5C is biased by the compression spring 42 toward the front side (−Y side) of the image forming apparatus 100. Due to the weight of the image forming unit 5C, however, a large frictional force is generated between the image forming unit 5C and a portion of the housing 100*m* of the image forming apparatus 100 which supports the image forming unit 5C. As a result, the image forming unit 5C does not move toward the front side (−Y side) due to the biasing force of the compression spring 42. Even if the image forming unit 5C attempts to move toward the front side (−Y side) due to the biasing force of the compression spring 42, the movement to the front side (−Y side) of the image forming unit 5C is restrained by the unit restraining portion 70*a* provided in the operation lever 70 described above. Therefore, the image forming unit 5C can be located in the mounting position.

Each of the opening 41*a* of the shutter member 41 and the waste toner receiving port 21C is designed so as to be larger than the waste toner discharge port 52*a* of the waste toner drop passage 52, thereby restraining the waste toner from adhering to the shutter member 41. The area around the waste toner receiving port 21C is provided with an elastic member 24C made of sponge, for example. The elastic member 24C surrounds the waste toner receiving port 21C. When the image forming unit 5C is mounted in the housing 100*m* of the image forming apparatus 100, the elastic member 24C is compressed and comes into contact with the shutter member 41. This configuration can provide good sealing, thereby preventing the waste toner from scattering into the housing 100*m* of the image forming apparatus 100 and also preventing the housing 100*m* of the image forming apparatus 100 from being contaminated.

By removing the image forming units 5Y, 5M, and 5C for the respective colors, the image forming apparatus 100 according to the present embodiment can be applied to a monochrome machine. Thus, the components, systems, and functions constituting the image forming apparatus 100 are used commonly for both a color machine and a monochrome machine. More specifically, the intermediate transfer unit 15 serving as an intermediate transcriber, the secondary transfer roller 9 serving as the secondary transcriber, the fixing device 10 serving as the fixer, the sheet feeding device 4 serving as the feeder, the sheet ejection roller 11 serving as an ejector, and some other components are used commonly for both a color machine and a monochrome machine.

As described above, the image forming apparatus 100 from which the image forming units 5Y, 5M, and 5C for the respective colors have been removed can be converted into a monochrome machine. In addition, many components can be used commonly for both a color machine and a monochrome machine. This configuration enables a decreased number of resources to be newly introduced, thereby successfully providing an image forming apparatus 100 at low cost. Moreover, it is possible to enhance the recyclability from a color machine to a monochrome machine and from a monochrome machine to a color machine.

When the image forming apparatus 100 from which the image forming units 5Y, 5M, and 5C for the respective colors have been removed is used as a monochrome machine, if the waste toner receiving ports 21Y, 21M, and 21C for the respective colors are kept open, the waste toner may scatter via the waste toner receiving ports 21Y, 21M, and 21C for color image formation, thereby contaminating the interior of the housing 100*m* of the image forming apparatus 100.

Therefore, when the image forming apparatus 100 is used as a monochrome machine, the waste toner receiving ports 21Y, 21M, and 21C for respective colors have been conventionally blocked with seal members. However, in a case where the usage of the image forming apparatus 100 is switched from a color machine to a monochrome machine or from a monochrome machine to a color machine, it is necessary to attach/detach the seal members to or from the waste toner receiving ports 21Y, 21M, and 21C of the respective colors, which may disadvantageously involve an increased number of assembly steps. In some cases, the housing 100*m* of the image forming apparatus 100 is provided with a shutter mechanism to expose and cover the waste toner receiving ports 21Y, 21M, and 21C. For this configuration, however, some more additional components are necessary, which may lead to cost increase.

In the present embodiment, an inner cover is provided for a monochrome machine. This inner cover blocks the waste toner receiving ports 21Y, 21M, and 21C for the respective colors. A concrete description will be given below with reference to some accompanying drawings.

Figure 10:
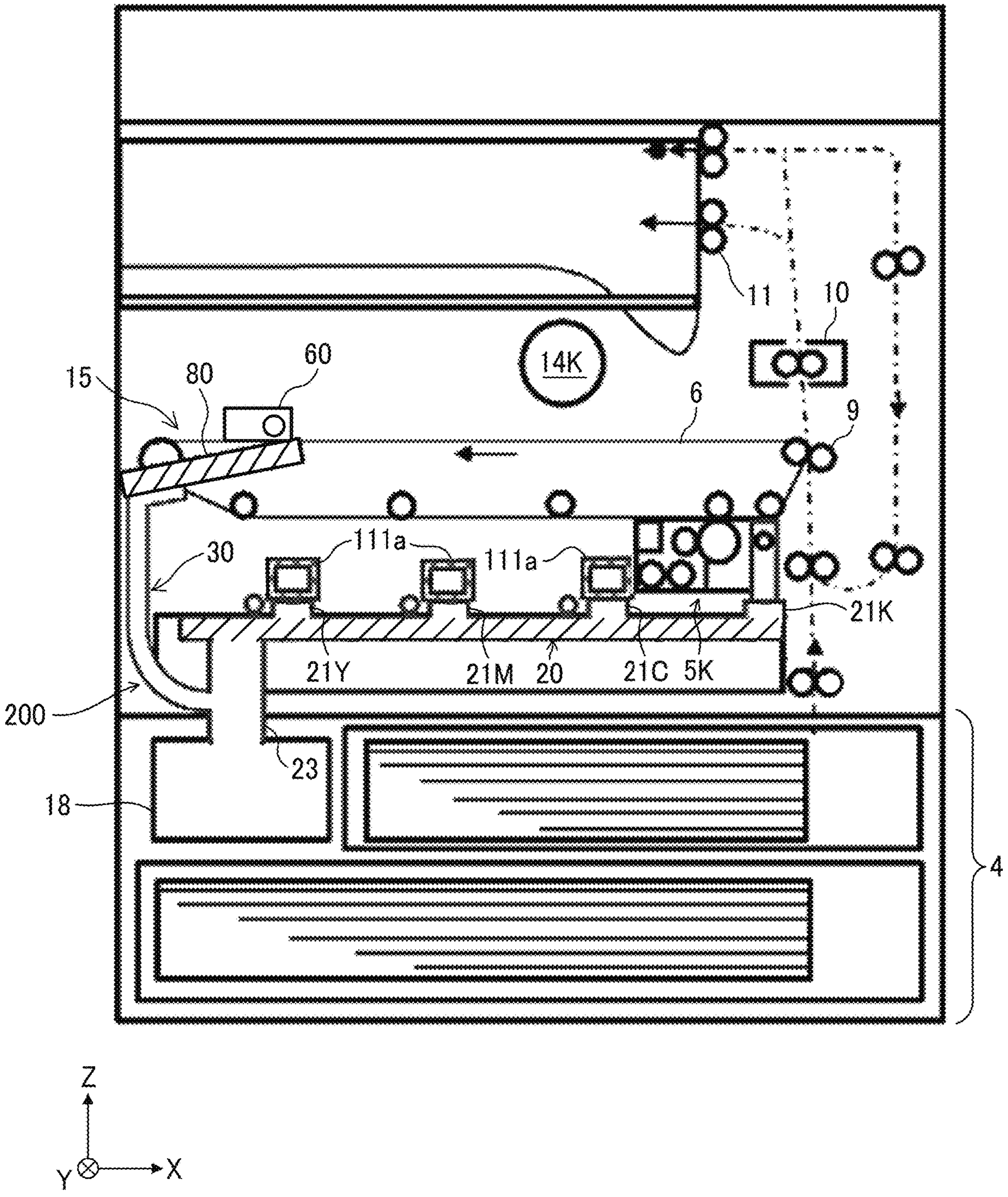
FIG. 10 is a schematic configuration diagram illustrating a configuration of the image forming apparatus when the image forming apparatus is used as a monochrome machine.
Figure 11:
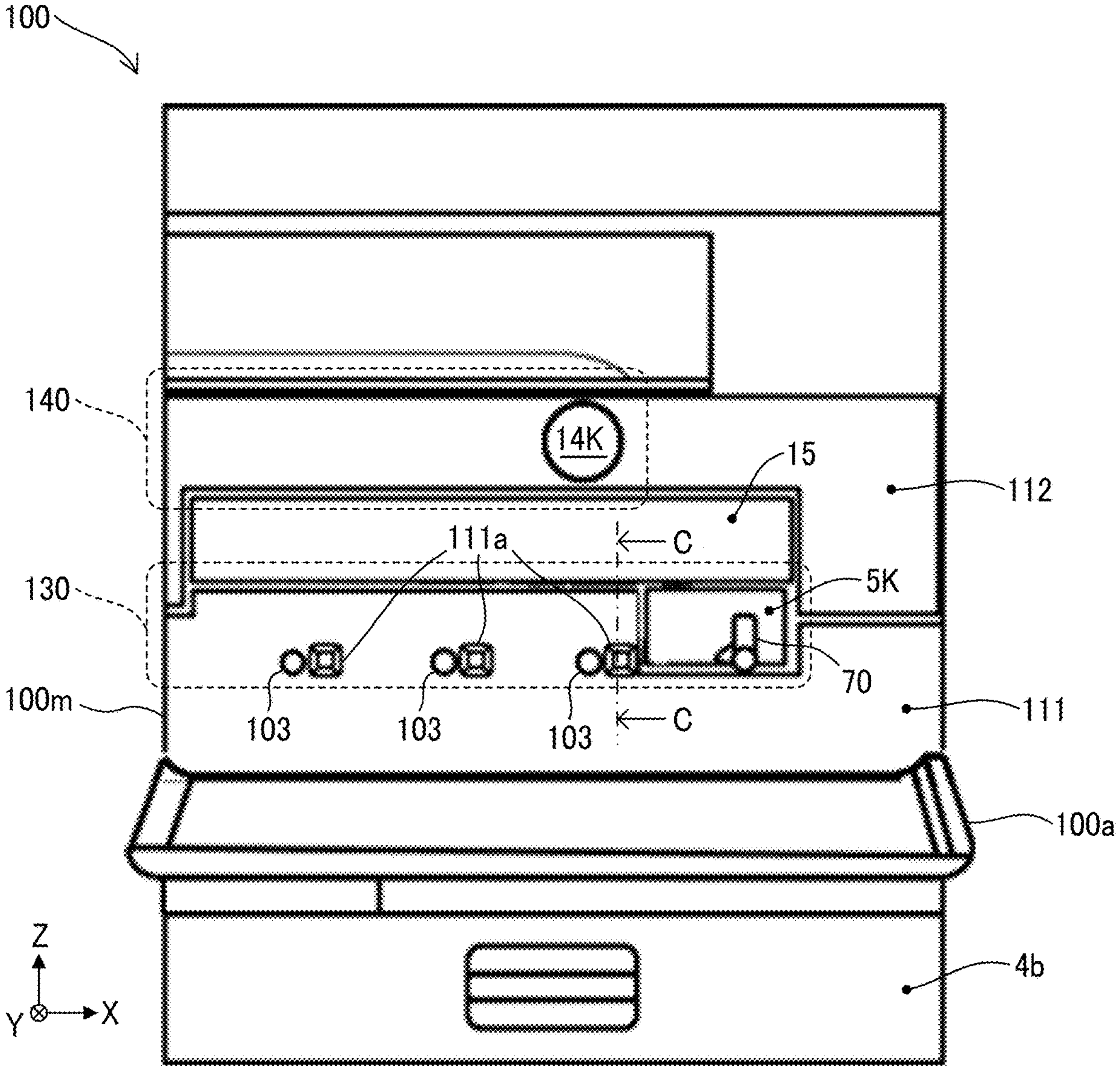
FIG. 11 is a schematic front view of the image forming apparatus with the front cover open when the image forming apparatus is used as a monochrome machine.

FIG. 10 is a schematic configuration diagram illustrating a configuration of the image forming apparatus 100 when the image forming apparatus 100 is used as a monochrome machine; FIG. 11 is a schematic front view of the image forming apparatus 100 with the front cover 100*a* open when the image forming apparatus 100 is used as a monochrome machine.

As illustrated in FIGS. 10 and 11, when the image forming apparatus 100 is used as a monochrome machine, the image forming unit 5K is mounted in the image forming unit attaching portion 130, and the toner bottle 14K is mounted in the toner bottle attaching portion 140. In addition, when the image forming apparatus 100 is used as a monochrome machine, as illustrated in FIG. 11, a first monochrome inner cover 111 and a second monochrome inner cover 112 are attached as monochrome inner covers to the image forming apparatus 100.

Similar to the first-color inner cover 121, the first monochrome inner cover 111 covers the waste toner conveying device 200, the exposure device 7, and some other components and further covers portions of the image forming unit attaching portion 130 in which the image forming units 5Y, 5M, and 5C for the respective colors are mounted. Moreover, the first monochrome inner cover 111 is provided with three receiving port blocking portions 111*a* that block the waste toner receiving ports 21Y, 21M, and 21C for the respective colors.

Similar to the second-color inner cover 122, the second monochrome inner cover 112 covers the fixing device 10, the secondary transfer roller 9, and some other components. Furthermore, the second monochrome inner cover 112 covers portions of the toner bottle attaching portion 140 in which the toner bottles 14Y, 14M, and 14C for the respective colors are mounted.

Figure 12:
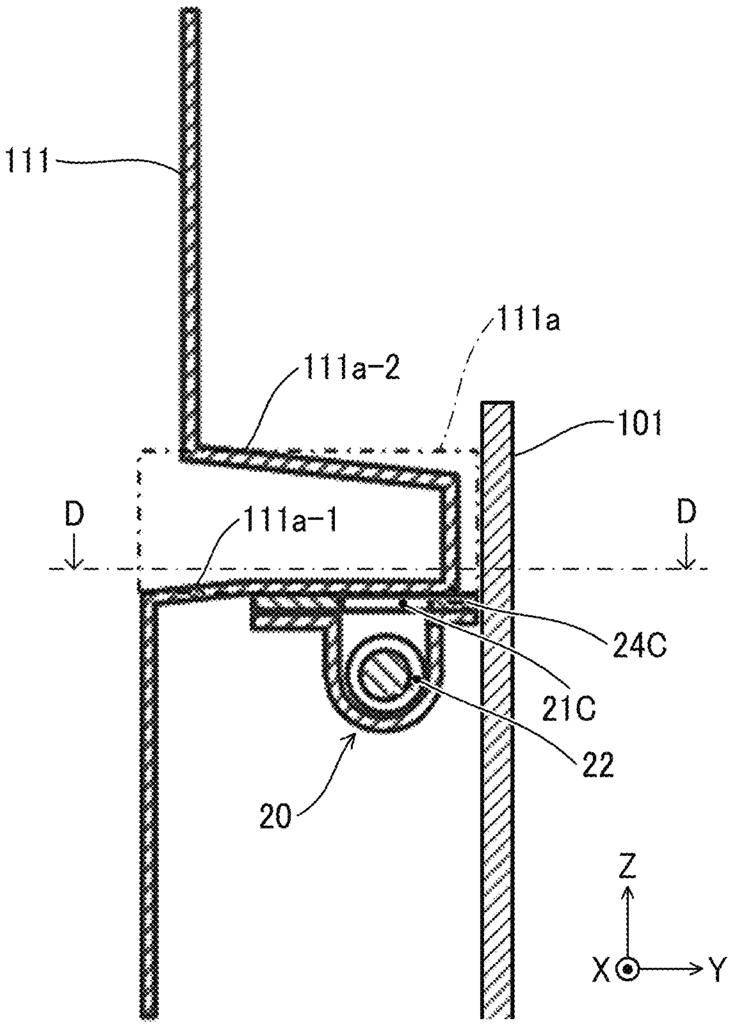
FIG. 12 is a cross-sectional view taken along line C-C of FIG. 11.
Figure 13:
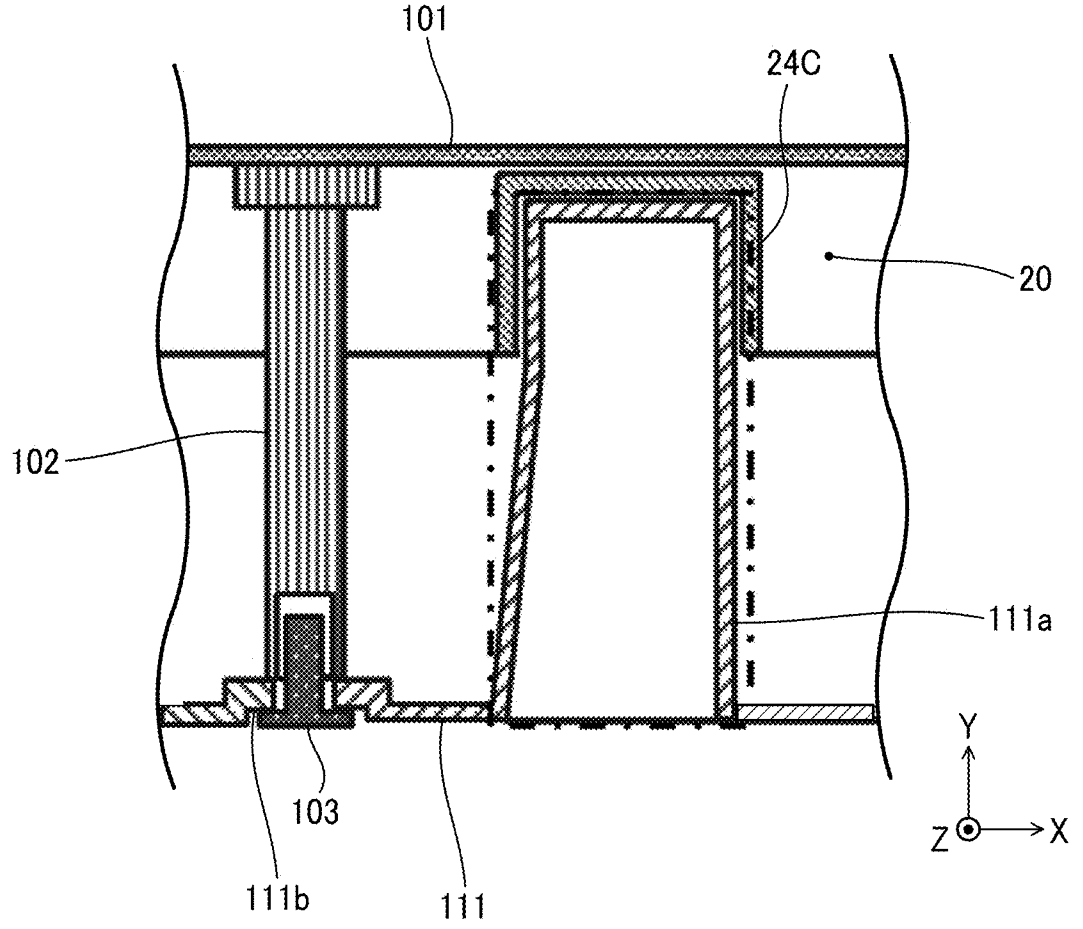
FIG. 13 is a cross-sectional view along line D-D of FIG. 12.

FIG. 12 is a cross-sectional view taken along line C-C of FIG. 11; FIG. 13 is a cross-sectional view taken along line D-D of FIG. 12.

Hereinafter, a receiving port blocking portion 111*a* that blocks the waste toner receiving port 21C will be described; however, the other receiving port blocking portions 111*a* have substantially the same configuration.

The receiving port blocking portion 111*a* has a rectangular shape recessed toward the interior (+Y side) of the image forming apparatus 100. As illustrated in FIGS. 12 and 13, the receiving port blocking portion 111*a* is in contact with the elastic member 24C provided on the area around the waste toner receiving port 21C, thereby blocking the waste toner receiving port 21C. This configuration can prevent the waste toner from scattering via the waste toner receiving port 21C, thereby contaminating the interior of the image forming apparatus 100.

When the color machine is recycled as a monochrome machine, it is necessary to replace the first-color inner cover with the first monochrome inner cover 111, thereby successfully blocking the three waste toner receiving ports 21Y, 21M, and 21C for the respective colors. In this way, the three waste toner receiving ports 21Y, 21M, and 21C for the respective colors can be blocked simply by replacing one member with another. It is thus possible to easily convert a color machine into a monochrome machine, as opposed to a configuration in which the seal member is attached to and blocks the waste toner receiving ports 21Y, 21M, and 21C for the respective colors.

Moreover, a single member, namely, the first monochrome inner cover 111 can be used to block the three waste toner receiving ports 21Y, 21M, and 21C for the respective colors. This configuration enables the image forming apparatus 100 to be assembled with a small number of components, thereby successfully providing an image forming apparatus 100 at low cost, when compared with a configuration in which the waste toner receiving ports 21Y, 21M, and 21C for the respective colors are provided with shutter mechanisms that block the three waste toner receiving ports 21Y, 21M, and 21C for the respective colors.

As illustrated in FIG. 13, the first monochrome inner cover 111 is provided with a fastening portion 111*b* having a recessed shape having a central through-hole through which the screw 103 is to pass. The fastening portion 111*b* is screwed by the screw 103 to the shaft 102 to which the operation lever 70 is screwed. This configuration enables the shaft 102 to be used commonly for both a color machine and a monochrome machine, thereby successfully providing an image forming apparatus 100 at low cost.

By screwing the first monochrome inner cover 111 to the shaft 102, as illustrated in FIG. 13, the first monochrome inner cover 111 can be fastened to the housing 100*m* of the image forming apparatus 100 near the waste toner receiving port 21C. As described above, the first monochrome inner cover 111 is fastened to the housing 100*m* of the image forming apparatus 100 near the waste toner receiving port 21C. It is thereby possible to restrain the receiving port blocking portion 111*a* and some surrounding components from being deformed and the receiving port blocking portion 111*a* and some surrounding components from being warped due to the reaction force of the elastic member 24C being compressively deformed. Consequently, it is possible to restrain a gap from being created between the elastic member 24C and the receiving port blocking portion 111*a*, thereby restraining the waste toner from scattering.

The first monochrome inner cover 111 is a resin-molded product in which the fastening portion 111*b* and the receiving port blocking portion 111*a* are integrally molded. By integrally molding the fastening portion 111*b* and the receiving port blocking portion 111*a*, the number of components can be decreased, thereby contributing to cost reduction in the image forming apparatus 100.

By forming the receiving port blocking portion 111*a* into the recessed shape, the thickness of the first monochrome inner cover 111 can be made uniform, thereby restraining molding defects, such as sink marks. As illustrated in FIG. 12, the receiving port blocking portion 111*a* having a recessed shape includes: a contact face 111*a*-1 in contact with the elastic member 24C; and an opposing face 111*a*-2 facing the contact face 111*a*-1. The opposing face 111*a*-2 is an inclined surface formed with the distance to the contact face 111*a*-1 decreasing toward the bottom of the receiving port blocking portion 111*a* (toward the interior of the image forming apparatus 100). In short, the opposing face 111*a*-2 has a draft angle. This configuration can enhance the releasability of the first monochrome inner cover 111 from a molding die.

Figure 14:
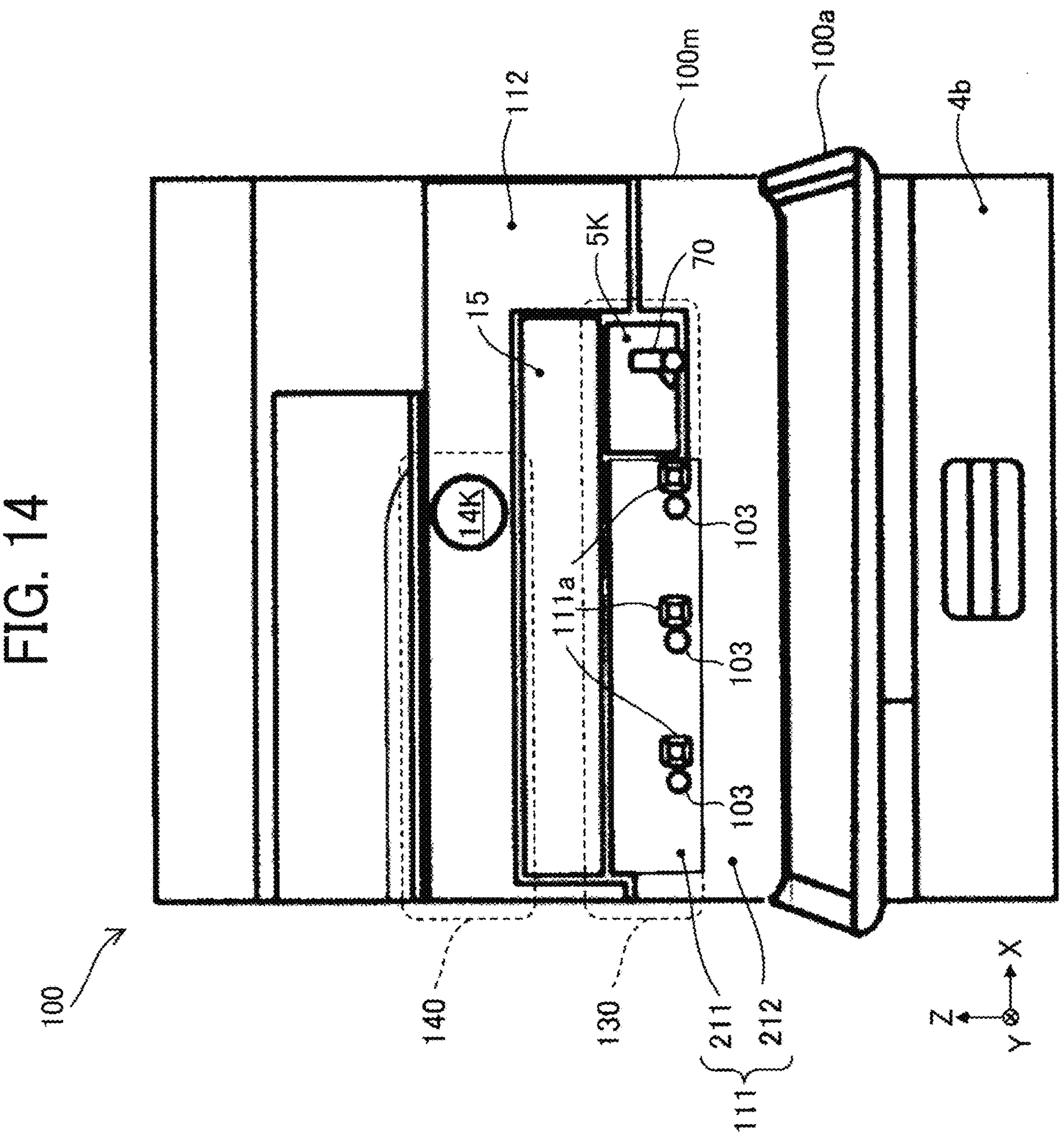
FIG. 14 is a schematic front view of a monochrome machine to which an inner cover including a first member and a second member is attached.

As illustrated in FIG. 14, the first monochrome inner cover 111 may include multiple first members 211, a second member 212, and some other components. Each of the first members 211 is a resin-molded product in which the fastening portion 111*b* (see FIG. 13) and the receiving port blocking portion 111*a* are integrally molded. In addition, the first members 211 cover the portions of the image forming unit attaching portion 130 in which the image forming units 5Y, 5M, and 5C for the respective colors are mounted. The second member 212 covers the waste toner conveying device 200, the exposure device 7, and some other components and engages with the first members 211 using a screw, for example.

With the configuration illustrated in FIG. 14, the second member 212 can be used as the first-color inner cover 121 to contribute to cost reduction in the image forming apparatus 100.

Figure 15:
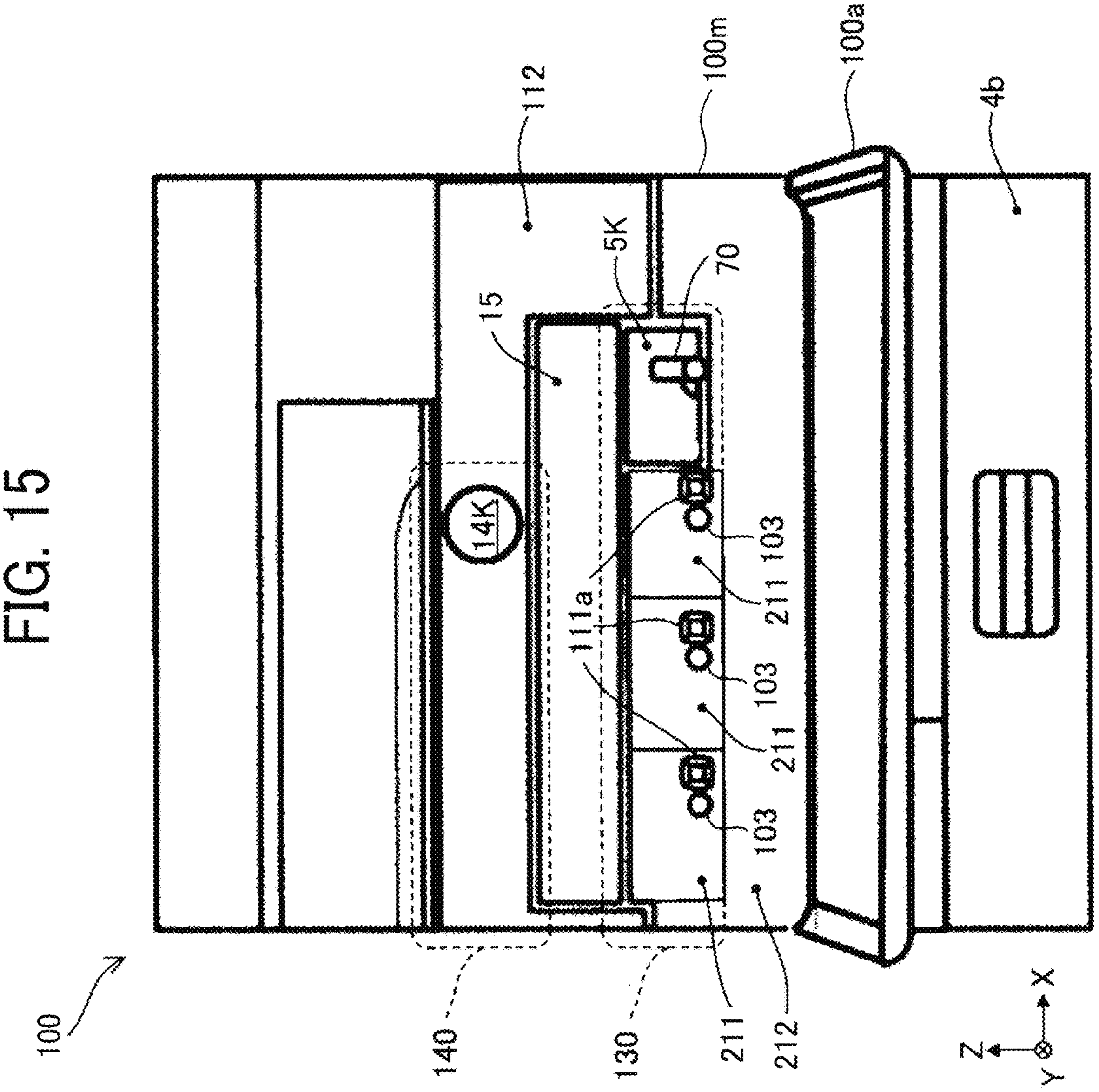
FIG. 15 is a schematic front view of the monochrome machine to which an inner cover is attached, the inner cover being formed so that a first member covers one of the portions of the image forming unit attaching portion in which image forming units for three colors are mounted.
Figure 16:
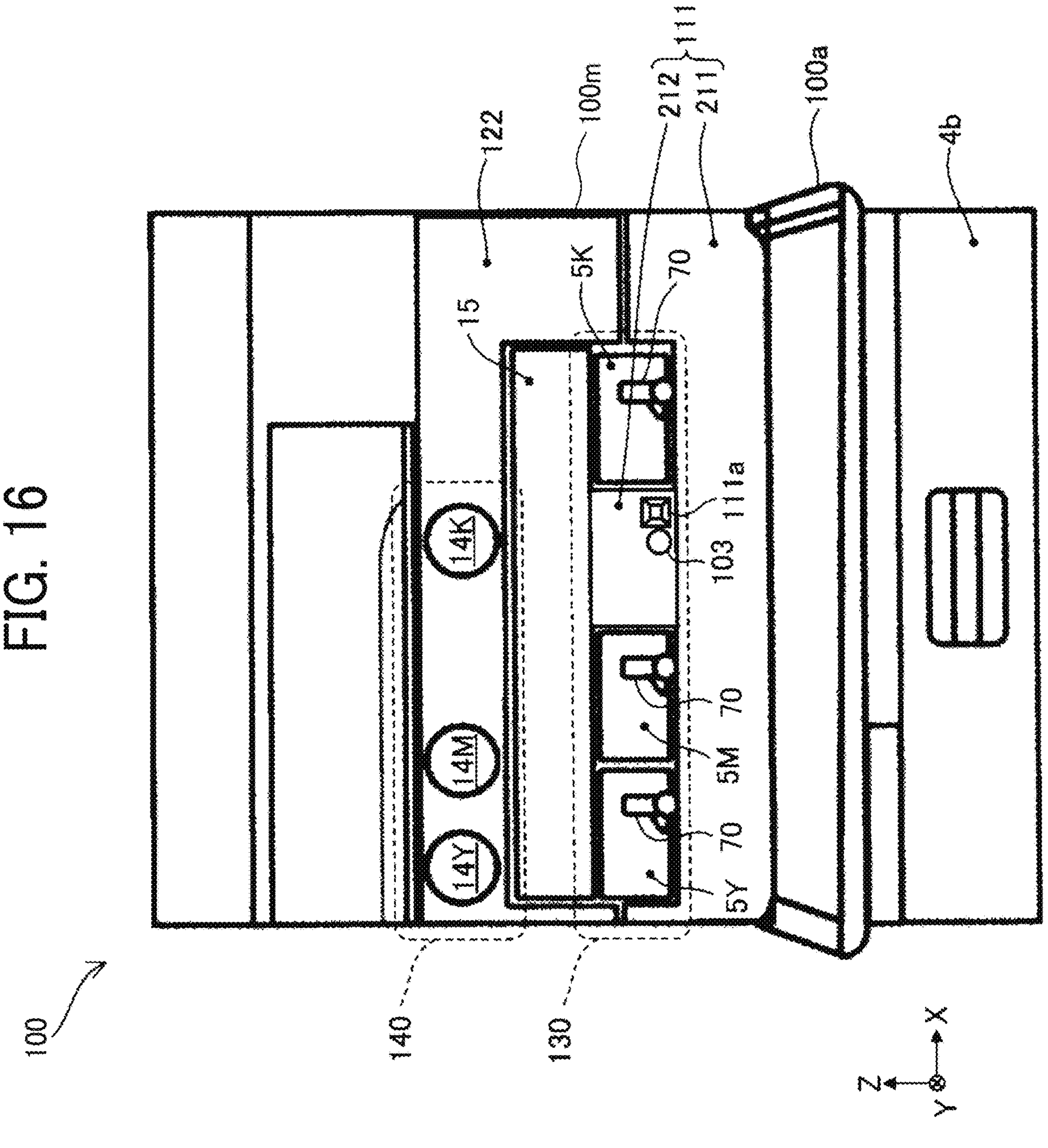
FIG. 16 is a schematic front view of a two-color image forming apparatus to which an inner cover is attached, the inner cover being formed so that the first member covers one of the portions of the image forming unit attaching portion in which image forming units for three colors are mounted.

Each first member 211 may be designed to cover one of the portions of the image forming unit attaching portion 130 in which the image forming units 5Y, 5M, and 5C for the three colors are mounted. The second member 212 may designed so that the multiple first members 211 engages with the second member 212. In such a configuration, the inner cover can be customized in accordance with the number of image forming units to be removed. For example, when the image forming apparatus 100 from which the image forming units 5Y, 5M, and 5C for the colors have been removed is used as a monochrome machine, as illustrated in FIG. 15, the monochrome inner cover can be formed by engaging three first members 211 with the second member 212. When the image forming apparatus 100 from which the image forming unit for C has been removed used as a three-color image forming apparatus, as illustrated in FIG. 16, the three-color inner cover can be formed by engaging a single first member 211 with the second member 212. When the image forming apparatus 100 from which the two image forming units 5C and 5M for C and M have been removed and in which the image forming unit for red (R) has been mounted instead of the image forming unit 5Y for Y is used as a two-color (red and black) image forming apparatus, the two-color inner cover can be formed by engaging two first members 211 with the second member 212. When the image forming apparatus 100 is used as a color machine, a color inner cover can be formed by engaging no first members 211 to the second member 212. It is thereby possible to reduce the number of resources and enhance the recyclability, thereby providing an image forming apparatus 100 at low cost.

The three first members 211 illustrated in FIG. 15 have identical shapes. In addition, the first member 211 can cover any of the three portions of the image forming unit attaching portion 130 in which the image forming units 5Y, 5M, and 5C for the respective colors are mounted. It is thereby possible to further reduce the number of resources and enhance the recyclability, thereby providing an image forming apparatus 100 at low cost.

Each first member 211 is preferably detachable from the housing 100*m* of the image forming apparatus 100 with the second member 212 attached to the housing 100*m* of the image forming apparatus 100. In this case, for example, the user can perform a process of recycling a monochrome machine to a color machine or a color machine to a monochrome machine without detaching the second member 212 from the image forming apparatus 100. It is thereby possible to provide the image forming apparatus 100 with enhanced recycle workability.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

For example, the waste toner container 18 provided with the waste toner receiving ports 21Y, 21M, 21C, and 21K may be used to constitute a configuration in which the waste toner in each of the image forming units 5Y, 5M, 5C, and 5K directly drops into the waste toner container 18 without using the waste toner conveying devices.

When the image forming apparatus 100 is used as a monochrome machine, for example, inner covers may be attached to the housing 100*m* of the image forming apparatus 100 to cover the portions of the toner bottle attaching portion 140 in which the toner bottles 14Y, 14M, and 14C for the respective colors are mounted. In this case, the second-color inner cover 122 may be used commonly for both a monochrome machine and a color machine. Alternatively, the second-color inner cover 122 may be provided with three inner covers that cover one of the three portions of the toner bottle attaching portion 140 in which the toner bottles for the respective colors are mounted.

The embodiments described above are simply examples. The present disclosure successfully produces the effects specific to the aspects that will be described below.

Aspect 1

In Aspect 1, an image forming apparatus (for example, the image forming apparatus 100) includes a housing (for example, the housing 100*m*), image forming units (for example, the image forming units 5Y, 5M, 5C, 5K), an image forming unit attaching portion (for example, the image forming unit attaching portion 130), waste toner receiving ports (21Y, 21M, 21C, 21K), a waste toner storing portion (for example, the waste toner container 18), and an inner cover (for example, the first monochrome inner cover 111). The image forming units form respective toner images with different colors from each other. The image forming unit attaching portion is a portion to which the image forming units are attachable. The waste toner receiving ports are disposed at respective portions of the image forming units attached to the image forming unit attaching portion to receive waste toner discharged from the image forming units attached to the image forming unit attaching portion. The waste toner storing portion communicates with each of the waste toner receiving ports to store the waste toner received by the waste toner receiving ports. The inner cover is attachable to the housing when an image forming unit of the image forming units is attached to the image forming unit attaching portion to form a monochrome image. The inner cover has a receiving port blocking portion (for example, the receiving port blocking portions 111*a*) to block the waste toner receiving ports other than a waste toner receiving port corresponding to the image forming unit.

According to the configuration of Aspect 1, when an image forming apparatus is used as a monochromatic image forming apparatus, a waste toner receiving port corresponding to an image forming unit that is not mounted can be blocked with a single member, or a monochrome inner cover. This configuration enables the image forming apparatus to be assembled with a small number of components, thereby successfully providing an image forming apparatus at low cost, when compared with the configuration of the image forming apparatus in the related art.

Aspect 2

In Aspect 2, an image forming apparatus (for example, the image forming apparatus 100) includes a housing (for example, the housing 100*m*), image forming units (for example, the image forming units 5Y, 5M, 5C, 5K), an image forming unit attaching portion (for example, the image forming unit attaching portion 130), waste toner receiving ports (21Y, 21M, 21C, 21K), a waste toner storing portion (for example, the waste toner container 18), and an inner cover (for example, the first monochrome inner cover 111). The image forming units form respective toner images with different colors from each other. The image forming unit attaching portion is a portion to which the image forming units are attachable. The waste toner receiving ports are disposed at respective portions of the image forming units attached to the image forming unit attaching portion to receive waste toner discharged from the image forming units attached to the image forming unit attaching portion. The waste toner storing portion communicates with each of the waste toner receiving ports to store the waste toner received by the waste toner receiving ports. The inner cover covers the image forming unit attaching portion other than an area in which at least an image forming unit of the image forming units are attached. The inner cover has a receiving port blocking portion (for example, the receiving port blocking portions 111*a*) to block the waste toner receiving ports other than a waste toner receiving port corresponding to the at least an image forming unit.

According to the configuration of Aspect 2, when an image forming apparatus is used as a monochromatic image forming apparatus, a waste toner receiving port corresponding to an image forming unit that is not attached can be blocked with a single member, or an inner cover. This configuration enables the image forming apparatus to be assembled with a small number of components, thereby successfully providing an image forming apparatus at low cost, when compared with the configuration of the image forming apparatus in the related art.

Aspect 3

In Aspect 3, in the image forming apparatus according to Aspect 2, the inner cover includes a first member (for example, the first members 211) and a second member (for example, the second member 212). The first member has the receiving port blocking portion (for example, the receiving port blocking portions 111*a*) and covers the image forming unit attaching portion other than the area in which at least an image forming unit of the image forming units are attached. The second member is engaged with the first member. The first member is attached to or detached from the housing when the second member is attached to the housing.

According to the configuration of Aspect 3, as described with reference to FIGS. 14 to 16, when the image forming unit attaching portion (for example, the image forming unit attaching portion 130) has no portions in which the image forming units are not mounted, the second member alone is attached to the housing (for example, the housing 100*m*) of the image forming apparatus (for example, the image forming apparatus 100). When the image forming unit attaching portion has a portion in which an image forming unit is not mounted, the first member is attached so as to cover this portion, thereby successfully blocking a waste toner receiving port corresponding to an image forming unit that is not mounted with the receiving port blocking portion of the first member.

Aspect 4

In Aspect 4, in the image forming apparatus according to Aspect 3, the inner cover includes multiple first members (for example, the first members 211) including the first member. The multiple first members cover the image forming unit attaching portion (for example, the image forming unit attaching portion 130) over corresponding portions with the image forming units not attached to the image forming unit attaching portion. The second member (for example, the second member 212) is engageable with each of the multiple first members.

According to the configuration of Aspect 4, a portion of the image forming unit attaching portion in which an image forming unit is not mounted can be covered with a first member. In addition, a waste toner receiving port corresponding to the image forming unit that is not mounted can be blocked with a receiving port blocking portions (for example, the receiving port blocking portions 111*a*) of the first member. In either of the cases where the image forming apparatus (for example, the image forming apparatus 100) in which one image forming unit out of the four image forming units is mounted is used as a monochrome machine as illustrated in FIG. 15 and where the image forming apparatus in which two or three image forming units out of the four image forming units are mounted is used as a two-color machine as illustrated in FIG. 16, a waste toner receiving port corresponding to an image forming unit that is not mounted can be blocked with a receiving port blocking portion of a first member.

Aspect 5

In Aspect 5, in the image forming apparatus according to Aspect 4, the multiple first members (for example, the first members 211) has identical shapes.

According to the configuration of Aspect 5, as described with reference to FIGS. 15 and 16, there is no limitation on which portion is to be covered with a first member. Any portion of multiple mounting portions in the image forming unit attaching portion (for example, the image forming unit attaching portion 130) can be covered with a first member.

Aspect 6

In Aspect 6, the image forming apparatus according to any one of Aspects 1 to 5 further includes an elastic member (for example, elastic members 24Y, 24C, 24M, 24K) surrounding each of the waste toner receiving ports (for example, the waste toner receiving ports 21K, 21M, 21C, 21K). The receiving port blocking portion (for example, the receiving port blocking portions 111*a*) is in contact with the elastic member (24Y, 24C, 24M, 24K) to block the corresponding one (for example, the waste toner receiving port 21C) of the waste toner receiving ports (for example, the waste toner receiving ports 21K, 21M, 21C, 21K).

According to the configuration of Aspect 6, as described in the embodiment, the waste toner receiving ports can be seamlessly blocked. Consequently, it is possible to appropriately restrain toner from scattering via the waste toner receiving ports 21Y, 21C, and 21M.

Aspect 7

In Aspect 7, in the image forming apparatus according to any one of Aspects 1 to 6, the inner cover (for example, the inner cover 111) is fastened to the housing near the receiving port blocking portion.

According to the configuration of Aspect 7, as described in the embodiment, the inner cover can be restrained from being deformed around the receiving port blocking portions (for example, the receiving port blocking portions 111*a*) or from being warped around the receiving port blocking portions 111*a* due to the reaction force of the elastic member (for example, the elastic member 24C) being compressively deformed. Consequently, it is possible to restrain gaps from being created between the elastic members and the receiving port blocking portions, thereby restraining toner from scattering.

Aspect 8

In Aspect 8, the image forming apparatus according to any one of Aspects 1 to 7, further includes a shaft (for example, the shaft 102) attached to the housing, and a lever (for example, the operation lever 70) mounted on the shaft. The lever includes a locking member (for example, the unit restraining portion 70*a*) to lock the image forming units at attachment positions, and the inner cover is fastened to the shaft.

According to the configuration of Aspect 8, as described in the embodiment, each shaft can be used commonly for both a color machine and a monochrome machine. Consequently, it is possible to further decrease the number of resources, thereby providing an image forming apparatus at low cost.

Aspect 9

In Aspect 9, in the image forming apparatus according to any one of Aspects 1 to 8, the receiving port blocking portion (for example, the receiving port blocking portion 111*a*) is integrally molded with the inner cover (for example, the inner cover 111).

According to the configuration of Aspect 9, the number of components can be made smaller and the cost of the image forming apparatus can be made lower than when each receiving port blocking portion is a separate component.

Aspect 10

In Aspect 10, in the image forming apparatus according to Aspect 9, the receiving port blocking portion (for example, the receiving port blocking portion 111*a*) is integrally molded with a member that covers the image forming unit attaching portion (for example, the image forming unit attaching portion 130) over corresponding portions with the image forming units not attached to the image forming unit attaching portion.

According to the configuration of Aspect 10, the number of components can be made smaller and the cost of the image forming apparatus can be made lower than when each receiving port blocking portion is a separate component.

Aspect 11

In Aspect 11, in the image forming apparatus according to Aspect 9 or 10, the inner cover has a fastening portion (for example, the fastening portion 111*b*) integrally molded with the inner cover (for example, the inner cover 111) to be fastened to the housing near the receiving port blocking portion (for example, the receiving port blocking portion 111*a*) of the inner cover.

According to the configuration of Aspect 11, the number of components can be decreased. Consequently, it is possible to provide an image forming apparatus at low cost.

Aspect 12

In Aspect 12, in the image forming apparatus according to any one of Aspects 9 to 11, the receiving port blocking portion (for example, the receiving port blocking portion 111*a*) has a recessed shape in which the receiving port blocking portion is recessed from a main body of the inner cover (for example, the inner cover 111) toward an interior of the image forming apparatus.

According to the configuration of Aspect 12, a thickness of the inner cover can be made uniform. Consequently, this configuration can restrain molding defects in integral molding. In addition, this configuration can achieve material-cost reduction.

Aspect 13

In Aspect 13, in the image forming apparatus according to Aspect 12, the receiving port blocking portion (for example, the receiving port blocking portion 111*a*) has a recessed portion and includes a first face (for example, the contact face 111*a*-1) in contact with a corresponding one of the waste toner receiving ports, and a second face (for example, the opposing face 111*a*-2) facing the first face. The second face is a sloped face with a distance to the first face decreasing toward a bottom of the receiving port blocking portion.

According to the configuration of Aspect 13, the releasability from a molding die by which each receiving port blocking portion of the inner cover which has the recessed shape is to be molded can be enhanced.

Aspect 14

In Aspect 14, the image forming apparatus according to any one of Aspect 1 to 13 further includes a waste toner conveying portion (for example, the waste toner conveying device 200) to convey the waste toner received by the waste toner receiving ports (for example, the waste toner receiving ports 21Y, 21C, 21M, 21K) to the waste toner storing portion (for example, the waste toner container 18).

According to the configuration of Aspect 14, as described in the embodiment, the waste toner that has been received by each of the waste toner receiving ports can be stored in the waste toner storing portion.

Aspect 15

In Aspect 15, the image forming apparatus according to any one of Aspects 1 to 14 further includes a primary transfer device (for example, the intermediate transfer unit 15), a secondary transfer device (for example, the secondary transfer roller 9), a feeding device (for example the sheet feeding device 4), a fixing device (for example, the fixing device), and an ejection device (for example, the sheet ejection roller 11). The primary transfer device includes an intermediate transferer (for example, the intermediate transfer belt 6) on which the toner images formed by the image forming units are overlaid. The secondary transfer device transfers the toner images on the intermediate transferer onto a sheet. The feeding device feeds the sheet toward the secondary transfer device. The fixing device fixes the toner images transferred onto the sheet, to the sheet. The ejection device ejects the sheet to an outside of the image forming apparatus. The primary transfer device, the secondary transfer device, the feeding device, the fixing device, and the ejection device are commonly used to form a monochrome image with an image forming unit of a part of the image forming units attached to the image forming unit attaching portion (for example, the image forming unit attaching portion 130), and form a color image with the image forming units attached to the image forming unit attaching portion.

According to the configuration of Aspect 15, as described in the embodiment, many components are used commonly for both a color image forming apparatus, such as a color machine, and a monochrome image forming apparatus, such as a monochrome machine. Consequently, this configuration can decrease the number of resources to be newly introduced, thereby providing an image forming apparatus 100 at low cost. Furthermore, this configuration can enhance the recyclability from a color image forming apparatus to a monochromatic image forming apparatus and from a monochromatic image forming apparatus to a color image forming apparatus.

Aspect 16

In Aspect 16, an image forming apparatus (for example, the image forming apparatus 100) includes attachment portions (for example, the image forming unit attaching portion 130), receiving ports (for example, the waste toner receiving ports 21K, 21M, 21C, 21Y), a storing portion (for example, the waste toner container 18), and an inner cover (for example, the inner cover 111). The attachment portions are portions to which multiple image forming units (for example, the image forming units 5Y, 5M, 5C, 5K), to form respective toner images with different colors from each other, are respectively attachable. The receiving ports are respectively disposed at the attachment portions, and are receivable waste toner respectively discharged from the multiple image forming units attached to the attachment portions. The storing portion communicates with each of the receiving ports to store the waste toner received by the receiving ports. The inner cover has a blocking portion (for example, the receiving port blocking portions 111*a*) blocking a part of the receiving ports other than a receiving port of an image forming unit of the multiple image forming units attached to the attachment portions.

Aspect 17

In Aspect 17, in the image forming apparatus according to Aspect 16, the inner cover (for example, the inner cover 111) covers a part of the attachment portions other than an attachment portion of the image forming unit.

Aspect 18

In Aspect 18, in the image forming apparatus according to Aspect 17, the inner cover includes a first member (for example, the first members 211) and a second member (for example, the second member 212). The first member has the blocking portion (for example, the receiving port blocking portions 111*a*). The first member covers a part of the attachment portions other than an area in which the image forming unit of the multiple image forming units is attached. The second member is engaged with the first member. The first member is attached to or detached from a housing (for example, the housing 100*m*) when the second member is attached to the housing.

Aspect 19

In Aspect 19, in the image forming apparatus according to Aspect 18, the inner cover includes multiple first members (for example, the first members 211) including the first member. The multiple first members cover the attachment portions (for example, the image forming unit attaching portion 130) over corresponding portions with the multiple image forming units being absent. The second member (for example, the second member 212) is engageable with each of the multiple first members.

Aspect 20

In Aspect 20, in the image forming apparatus according to Aspect 19, the multiple first members (for example, the first members 211) has identical shapes.

Aspect 21

In Aspect 21, the image forming apparatus according to any one of Aspects 16 to 20 further includes an elastic member (for example, the elastic member 24C) surrounding each of the receiving ports (for example, the waste toner receiving ports 21K, 21M, 21C, 21K). The blocking portion (for example, the receiving port blocking portions 111*a*) is in contact with the elastic member to block the receiving ports.

Aspect 22

In Aspect 22, in the image forming apparatus according to Aspect any one of Aspects 16 to 21, further includes a housing (for example, the housing 100*m*) housing the image forming unit, the attachment portions, the receiving ports, the storing portion, and the inner cover. The inner cover (for example, the inner cover 111) is fastened to the housing in a vicinity of the blocking portion.

Aspect 23

In Aspect 23, the image forming apparatus according to any one of Aspects 16 to 22, further includes a shaft (for example, the shaft 102) attached to the housing, and a lever (for example, the operation lever 70) mounted on the shaft. The lever includes a lock (for example, the unit restraining portion 70*a*) to lock the image forming unit attached to an attachment portion of the attachment portions. The inner cover (for example, the inner cover 111) is fastened to the shaft.

Aspect 24

In Aspect 24, in the image forming apparatus according to any one of Aspects 16 to 23, the blocking portion (for example, the receiving port blocking portion 111*a*) is integrally molded with the inner cover (for example, the inner cover 111).

Aspect 25

In Aspect 25, in the image forming apparatus according to Aspect 24, the blocking portion (for example, the receiving port blocking portion 111*a*) is integrally molded with a member that covers a part of the attachment portions other than a portion to which the image forming unit is attached.

Aspect 26

In Aspect 26, in the image forming apparatus according to Aspect 24 or 25, the inner cover has a fastening portion (for example, the fastening portion 111*b*) integrally molded with the inner cover (for example, the inner cover 111) to be fastened to a housing (for example, the housing 100*m*) near the blocking portion (for example, the receiving port blocking portion 111*a*) of the inner cover.

Aspect 27

In Aspect 27, in the image forming apparatus according to any one of Aspects 9 to 26, the blocking portion has a recessed shape in which the blocking portion (for example, the receiving port blocking portion 111*a*) is recessed from a main body of the inner cover (for example, the inner cover 111) toward an interior of the image forming apparatus.

Aspect 28

In Aspect 28, in the image forming apparatus according to Aspect 27, the blocking portion (for example, the receiving port blocking portion 111*a*) has a recessed portion and includes a first face (for example, the contact face 111*a*-1) in contact with a corresponding one of the receiving ports, and a second face (for example, the opposing face 111*a*-2) facing the first face. The second face is a sloped face with a distance to the first face decreasing toward a bottom of the blocking portion.

Aspect 29

In Aspect 29, the image forming apparatus according to any one of Aspect 16 to 28 further includes a waste toner conveying portion (for example, the waste toner conveying device 200) to convey the waste toner received by the receiving ports (for example, the waste toner receiving ports 21Y, 21C, 21M, 21K) to the storing portion (for example, the waste toner container 18).

Aspect 30

In Aspect 30, the image forming apparatus according to any one of Aspects 16 to 19 further includes a primary transfer device (for example, the intermediate transfer unit 15), a secondary transfer device (for example, the secondary transfer roller 9), a feeding device (for example the sheet feeding device 4), a fixing device (for example, the fixing device), and an ejection device (for example, the sheet ejection roller 11). The primary transfer device includes an intermediate transferer (for example, the intermediate transfer belt 6) on which the toner images formed by the multiple image forming units are overlaid. The secondary transfer device transfers the toner images on the intermediate transferer onto a sheet. The feeding device feeds the sheet toward the secondary transfer device. The fixing device fixes the toner images transferred onto the sheet, to the sheet. The ejection device ejects the sheet to an outside of the image forming apparatus. The primary transfer device, the secondary transfer device, the feeding device, the fixing device, and the ejection device are commonly used to form a monochrome image with an image forming unit of a part of the multiple image forming units attached to the attachment portions (for example, the image forming unit attaching portion 130), and form a color image with the multiple image forming units attached to the attachment portions.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

What is claimed is:

1. An image forming apparatus comprising:

attachment portions to which multiple image forming units, to form respective toner images with different colors from each other, are respectively attachable;

receiving ports:

respectively disposed at the attachment portions; and configured to receive waste toner respectively discharged from the multiple image forming units attached to the attachment portions;

a storing portion communicating with each of the receiving ports to store the waste toner received by the receiving ports; and an inner cover having a blocking portion blocking a part of the receiving ports other than a receiving port of an image forming unit of the multiple image forming units attached to the attachment portions, wherein the blocking portion is integrally molded with the inner cover, wherein the blocking portion has a recessed shape in which the blocking portion is recessed from a main body of the inner cover toward an interior of the image forming apparatus, and the blocking portion has a rectangular shape recessed toward the interior of the image forming apparatus.

2. The image forming apparatus according to claim 1, wherein;

the inner cover covers a part of the attachment portions other than an attachment portion of the image forming unit.

3. The image forming apparatus according to claim 2, wherein;

the inner cover includes:

a first member having the blocking portion, the first member to cover a part of the attachment portions other than an area in which the image forming unit of the multiple image forming units is attached; and a second member engaged with the first member, and the first member is attached to or detached from a housing when the second member is attached to the housing.

4. The image forming apparatus according to claim 3, wherein;

the inner cover includes multiple first members including the first member, the multiple first members cover the attachment portions over corresponding portions with the multiple image forming units being absent, and the second member is engageable with each of the multiple first members.

5. The image forming apparatus according to claim 4, wherein;

the multiple first members has identical shapes.

6. The image forming apparatus according to claim 1, further comprising:

an elastic member surrounding each of the receiving ports, wherein the blocking portion is in contact with the elastic member to block the receiving ports.

7. The image forming apparatus according to claim 1, further comprising:

a housing containing the attachment portions, the receiving ports, the storing portion, and the inner cover, wherein the inner cover is fastened to the housing in a vicinity of the blocking portion.

8. The image forming apparatus according to claim 1, further comprising:

a housing;

a shaft attached to the housing; and a lever mounted on the shaft, wherein:

the lever includes a lock to lock the image forming unit attached to an attachment portion of the attachment portions, and the inner cover is fastened to the shaft.

9. The image forming apparatus according to claim 1, wherein;

the blocking portion is integrally molded with a member that covers a part of the attachment portions other than a portion to which the image forming unit is attached.

10. The image forming apparatus according to claim 1, wherein:

the inner cover has a fastening portion integrally molded with the inner cover to be fastened to a housing near the blocking portion of the inner cover.

11. The image forming apparatus according to claim 1, wherein:

the blocking portion has a recessed portion and includes:

a first face in contact with a corresponding one of the receiving ports; and a second face facing the first face, the second face is a sloped face with a distance to the first face decreasing toward a bottom of the blocking portion.

12. The image forming apparatus according to claim 1, further comprising:

a waste toner conveying portion to convey the waste toner received by the receiving ports to the storing portion.

13. The image forming apparatus according to claim 1, further comprising:

a primary transfer device including an intermediate transferer on which the toner images formed by the multiple image forming units are overlaid;

a secondary transfer device to transfer the toner images on the intermediate transferer onto a sheet;

a feeding device to feed the sheet toward the secondary transfer device;

a fixing device to fix the toner images transferred onto the sheet, to the sheet; and an ejection device to eject the sheet to an outside of the image forming apparatus, wherein the primary transfer device, the secondary transfer device, the feeding device, the fixing device, and the ejection device are commonly used to:

form a monochrome image with an image forming unit of a part of the multiple image forming units attached to the attachment portions; and form a color image with the multiple image forming units attached to the attachment portions.

14. The image forming apparatus according to claim 1, further comprising:

a waste toner conveyor covered by the inner cover and to convey the waste toner to the storing portion.

15. The image forming apparatus according to claim 1, wherein:

the image forming unit comprises a photoconductor, and the waste toner comprises toner to be removed from the photoconductor.

16. The image forming apparatus according to claim 1, wherein:

the storing portion is disposed below the attachment portions in a vertical direction.

17. The image forming apparatus according to claim 1, further comprising:

an intermediate transfer belt onto which the toner images are transferred.

18. The image forming apparatus according to claim 1, wherein:

the inner cover is disposed on a front side of the image forming apparatus.

19. The image forming apparatus according to claim 1, further comprising:

an operation lever to lock the image forming unit to the attachment portions.

20. The image forming apparatus according to claim 1, wherein:

the multiple image forming units comprise a yellow image forming unit, a magenta image forming unit, a cyan image forming unit, and a black image forming unit.

* * * * *